US010180759B2

(12) United States Patent
Yamamoto et al.

(10) Patent No.: US 10,180,759 B2
(45) Date of Patent: Jan. 15, 2019

(54) COORDINATE DETECTING APPARATUS, SYSTEM, AND COORDINATE DETECTING METHOD

(71) Applicants: Seiko Yamamoto, Tokyo (JP); Katsuyuki Omura, Tokyo (JP); Noritada Ohi, Saitama (JP); Yoshiaki Oshima, Kanagawa (JP); Masafumi Nagao, Kanagawa (JP); Naoyuki Ishikawa, Kanagawa (JP); Masanobu Yamagata, Kanagawa (JP)

(72) Inventors: Seiko Yamamoto, Tokyo (JP); Katsuyuki Omura, Tokyo (JP); Noritada Ohi, Saitama (JP); Yoshiaki Oshima, Kanagawa (JP); Masafumi Nagao, Kanagawa (JP); Naoyuki Ishikawa, Kanagawa (JP); Masanobu Yamagata, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/379,078

(22) Filed: Dec. 14, 2016

(65) Prior Publication Data

US 2017/0177164 A1 Jun. 22, 2017

(30) Foreign Application Priority Data

Dec. 16, 2015 (JP) ................... 2015-244786

(51) Int. Cl.
*G06F 3/042* (2006.01)
*G06F 3/0354* (2013.01)
*G06F 3/041* (2006.01)

(52) U.S. Cl.
CPC ........ *G06F 3/0428* (2013.01); *G06F 3/03542* (2013.01); *G06F 3/0416* (2013.01);
(Continued)

(58) Field of Classification Search
CPC ......................................... G06F 3/042–3/0423
See application file for complete search history.

(56) References Cited

U.S. PATENT DOCUMENTS 4,766,424 A * 8/1988 Adler .................... G06F 3/0421
250/221
6,421,042 B1 7/2002 Omura et al.
(Continued)

FOREIGN PATENT DOCUMENTS

JP 2002-328716 11/2002
JP 2005-165832 6/2005
(Continued)

*Primary Examiner* — Hang Lin
(74) *Attorney, Agent, or Firm* — Oblon, McClelland, Maier & Neustadt, L.L.P.

(57) ABSTRACT

A coordinate detecting apparatus includes: a plurality of light-emitting and -receiving units arranged along an outer edge of the coordinate input area, the plurality of light-emitting and -receiving units each including a light-emitting part and a light-receiving part; at least one retroreflective member arranged along the outer edge of the coordinate input area; and a control unit to control the plurality of light-emitting and -receiving units to detect coordinates of a position of input made with a designation input unit in a first detection state or a second detection state.

15 Claims, 23 Drawing Sheets

(52) U.S. Cl.
CPC ............ *G06F 3/0425* (2013.01); *G06F 3/042* (2013.01); *G06F 2203/04106* (2013.01)

(56) References Cited

U.S. PATENT DOCUMENTS

| | | | |
|---|---|---|---|
| 6,429,856 | B1 | 8/2002 | Omura et al. |
| 6,480,187 | B1* | 11/2002 | Sano ................ G06F 3/0423 345/173 |
| 6,563,491 | B1 | 5/2003 | Omura |
| 6,594,023 | B1 | 7/2003 | Omura et al. |
| 2002/0008692 | A1 | 1/2002 | Omura et al. |
| 2002/0033805 | A1 | 3/2002 | Fujioka et al. |
| 2003/0001825 | A1 | 1/2003 | Omura et al. |
| 2003/0006973 | A1 | 1/2003 | Omura et al. |
| 2003/0128244 | A1 | 7/2003 | Iga et al. |
| 2003/0206306 | A1 | 11/2003 | Omura et al. |
| 2004/0196258 | A1 | 10/2004 | Fujioka et al. |
| 2007/0067370 | A1 | 3/2007 | Honda et al. |
| 2010/0207910 | A1* | 8/2010 | Liu ................ G06F 3/0416 345/175 |
| 2012/0032976 | A1 | 2/2012 | Nagahara et al. |
| 2012/0062591 | A1 | 3/2012 | Omura et al. |
| 2012/0200157 | A1 | 8/2012 | Ohi |
| 2012/0206387 | A1 | 8/2012 | Omura et al. |
| 2012/0215883 | A1 | 8/2012 | Noguchi et al. |
| 2012/0221947 | A1 | 8/2012 | Yukumoto et al. |
| 2012/0235934 | A1 | 9/2012 | Kawasaki et al. |
| 2013/0135263 | A1 | 5/2013 | Omura |
| 2013/0179871 | A1 | 7/2013 | Nagao et al. |
| 2013/0257816 | A1 | 10/2013 | Omura |
| 2014/0178647 | A1* | 6/2014 | Kim ................ B44C 5/0407 428/166 |
| 2014/0192058 | A1 | 7/2014 | Kodama et al. |
| 2014/0253514 | A1 | 9/2014 | Omura et al. |
| 2015/0035782 | A1 | 2/2015 | Kawasaki et al. |
| 2015/0054791 | A1 | 2/2015 | Omura |
| 2015/0067532 | A1 | 3/2015 | Omura et al. |
| 2015/0212728 | A1 | 7/2015 | Omura et al. |
| 2015/0331543 | A1* | 11/2015 | Lin ................ G06F 3/0421 345/175 |
| 2015/0346848 | A1 | 12/2015 | Omura |
| 2016/0116996 | A1 | 4/2016 | Ishikawa |
| 2016/0116998 | A1 | 4/2016 | Ishikawa |
| 2016/0241891 | A1 | 8/2016 | Ninomiya et al. |

FOREIGN PATENT DOCUMENTS

| | | |
|---|---|---|
| JP | 2013-175142 | 9/2013 |
| JP | 2004-310598 | 11/2014 |
| JP | 2015-148837 | 8/2015 |

\* cited by examiner

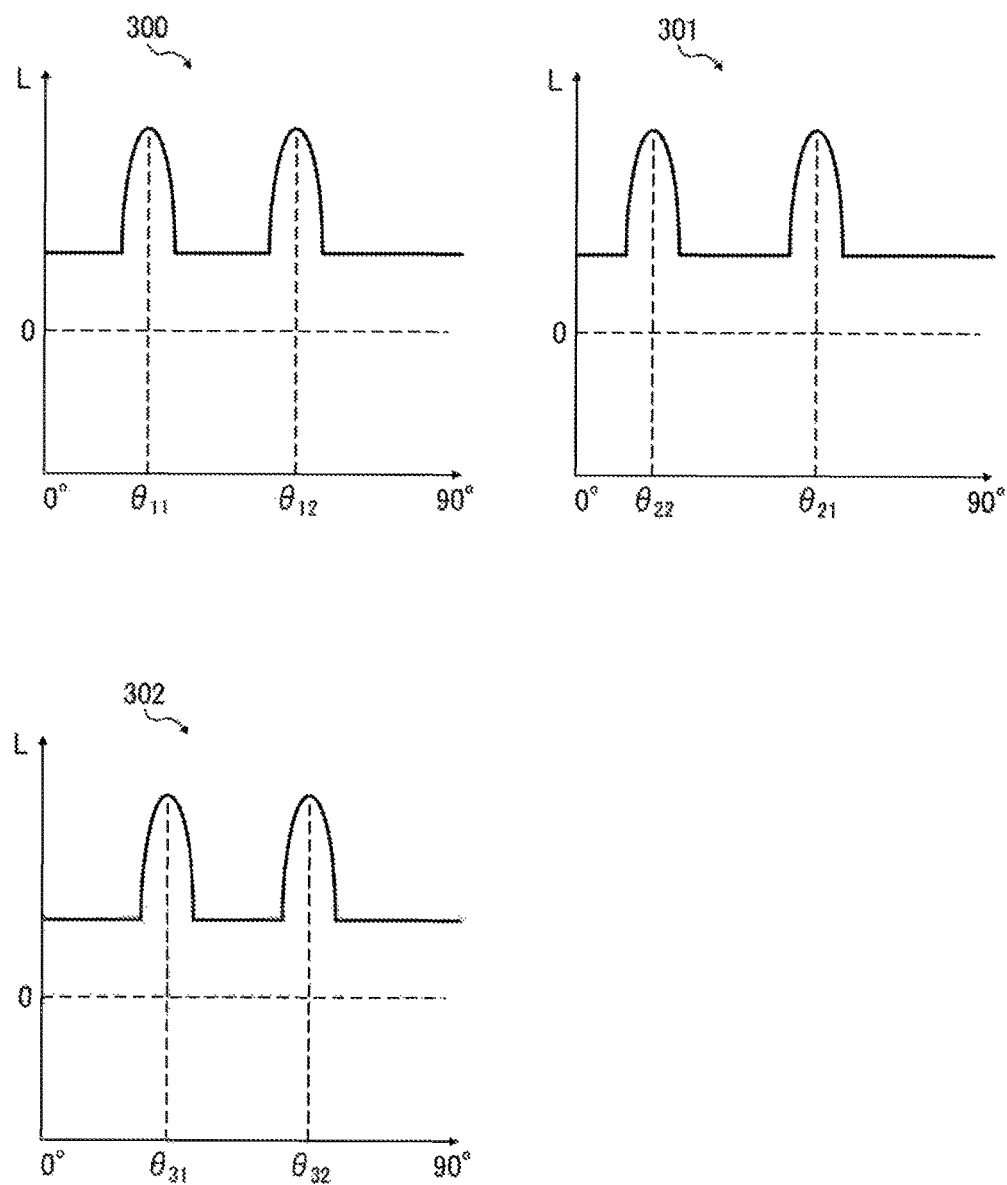

COORDINATE DETECTING APPARATUS, SYSTEM, AND COORDINATE DETECTING METHOD

CROSS-REFERENCE TO RELATED APPLICATIONS

This patent application is based on and claims priority pursuant to 35 U.S.C. § 119(a) to Japanese Patent Application No. 2015-244786, filed on Dec. 16, 2015, in the Japan Patent Office, the entire disclosure of which is hereby incorporated by reference herein.

BACKGROUND

Technical Field

The present invention relates to a coordinate detecting apparatus, a display or projection system including the same, and a coordinate detecting method.

Description of the Related Art

Development of apparatuses for detecting the coordinates of the position of input made with a designation input unit (such as a user's finger, a pointing stick, a pen, or the like) on a coordinate input area on a display surface or a projection surface has been vigorous in recent years.

For example, JP-2013-175142-A discloses an apparatus capable of detecting the coordinates of the position of input made with a designation input unit that emits light in response to coming into contact with a coordinate input area, and the coordinates of the position of input made with a designation input unit that emits no light.

SUMMARY

Example embodiments of the present invention include a coordinate detecting apparatus, which detects the coordinates of a position of input made with a designation input unit on a coordinate input area set on a surface. The coordinate detecting apparatus includes the following: a plurality of light-emitting and -receiving units arranged along an outer edge of the coordinate input area, the plurality of light-emitting and -receiving units each including a light-emitting part and a light-receiving part; at least one retroreflective member arranged along the outer edge of the coordinate input area; and a control unit to control the plurality of light-emitting and -receiving units to detect the coordinates. The control unit detects the coordinates of the position of input made with the designation input unit in a first detection mode or a second detection mode. The first detection mode is a mode of detecting the coordinates of the position of input made with the designation input unit based on light emitted from the input designation unit, when lighting of the light-emitting part is in a first state, the designation input unit emitting light when coming into contact with the coordinate input area. The second detection mode is a mode of detecting the coordinates of the position of input made with the designation input unit based on light blocked by the input designation unit, when lighting of the light-emitting part is in a second state, the designation input unit emitting no light.

In one example, the first state is a state in which the light-emitting part is turned off, and the second state is a state in which the light-emitting part is turned on.

In one example, the first state is a state in which the light-emitting part is turned on with a first output, and the second state is a state in which the light-emitting part is turned on with a second output higher than the first output.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 21B includes graphs illustrating the amounts of light received by three light-emitting and -receiving units when two pen-type input device are emitting light;

Figure 1:
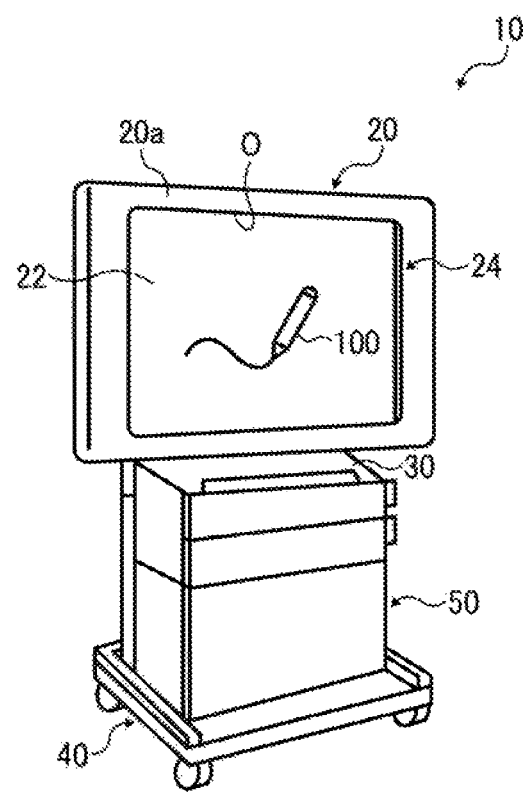
FIG. 1 is a perspective view illustrating the schematic configuration of an electronic information board system according to a first embodiment of the present invention.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Various technologies have been proposed for touchscreen input methods employed in electronic blackboards, electronic whiteboards, and electronic information boards. Among these technologies, an input device capable of distinguishingly detecting a pen on which a light-emitting element is mounted and a non-light-emitting body such as a finger has already been available.

However, such an input device capable of distinguishingly detecting a pen on which a light-emitting element is mounted and a non-light-emitting body such as a finger needs a light-guide plate made of a translucent material, light sources such as semiconductor infrared lasers that cause light to be incident from a lateral face of the light-guide plate in a plurality of rows in the X-direction and the Y-direction, and a plurality of light-receiving elements at positions facing these light sources. For the thickness of the light-guide plate, a parallax occurs between a pen contact portion and a display position on a display. Also, the input device requires a plurality of light-emitting elements and light-receiving elements, resulting in an increase in costs. Furthermore, a space for arranging these elements is necessary outside the display surface.

In order to solve the above problems, the inventors have conceived the following embodiments in order to provide a coordinate detecting apparatus that can distinguish input made with a light-emitting pen on which a light-emitting element is provided and input made with a non-light-emitting body such as a finger or a pointing stick, and that can be mounted as a simple unit on flat panels of various sizes, a display system and a projection system including the coordinate detecting apparatus, and a coordinate detecting method using the coordinate detecting apparatus.

First Embodiment

Hereinafter, a first embodiment of the present invention will be described with reference to the drawings.

FIG. 1 is a perspective view schematically illustrating an electronic information board system 10 serving as a display system according to the first embodiment.

As illustrated in FIG. 1, the electronic information board system 10 includes a display 20, a coordinate detecting apparatus 24, a stand 40, and a device container 50.

The display 20 includes a casing 20a with an opening at its front face, and a flat panel (such as a liquid crystal panel or a plasma panel) provided in the casing 20a such that a rectangular display surface 22 is exposed through the opening. The display 20 is controlled by a controller 60 (see FIGS. 6 to 8).

The display surface 22 has an image display function. In addition to that, a coordinate input area (touchscreen area) is set on the display surface 22, where the coordinates of a target to be detected by the coordinate detecting apparatus 24 are input.

The coordinate detecting apparatus 24 detects the coordinates of the position of input made with a designation input unit on the display surface 22. Note that the term "position of input" or "input position" refers to a position at which a light-emitting or non-light-emitting designation input unit comes into contact with or becomes close to the display surface 22.

Furthermore, text or graphics can be written or drawn on the display surface 22 by bringing a movable pen tip 120 of a dedicated pen-type input device 100 into contact with the display surface 22.

When the movable pen tip 120 comes into contact with the display surface 22, the pen-type input device 100 emits a writing detection signal as a wireless signal (such as infrared rays).

In response to reception of the writing detection signal from the pen-type input device 100 via a pen signal receiver 210 (see FIGS. 7 and 8), the controller 60 displays, on the display surface 22, text or graphics, for example, written or drawn at the coordinates detected by the coordinate detecting apparatus 24.

When a movable pen end 130 at another end of the pen-type input device 100 comes into contact with the display surface 22, the pen-type input device 100 emits an erasing detection signal, different from a writing detection signal, as a wireless signal (such as infrared rays).

In response to reception of the erasing detection signal from the pen-type input device 100) via the pen signal receiver 210 (see FIGS. 7 and 8), the controller 60 erases, from the display surface 22, text or graphics, for example, written or drawn at the coordinates detected by the coordinate detecting apparatus 24. That is, the controller 60 performs the erasing process.

As the erasing process, the controller 60 performs the displaying process of coloring the detected coordinates with the same color (such as white) as the background.

The device container 50 contains various devices, such as the controller 60, a printer, a video disk device, and so forth. On the top surface of the device container 50, a keyboard 30 for performing an input operation is mounted.

Figure 2:
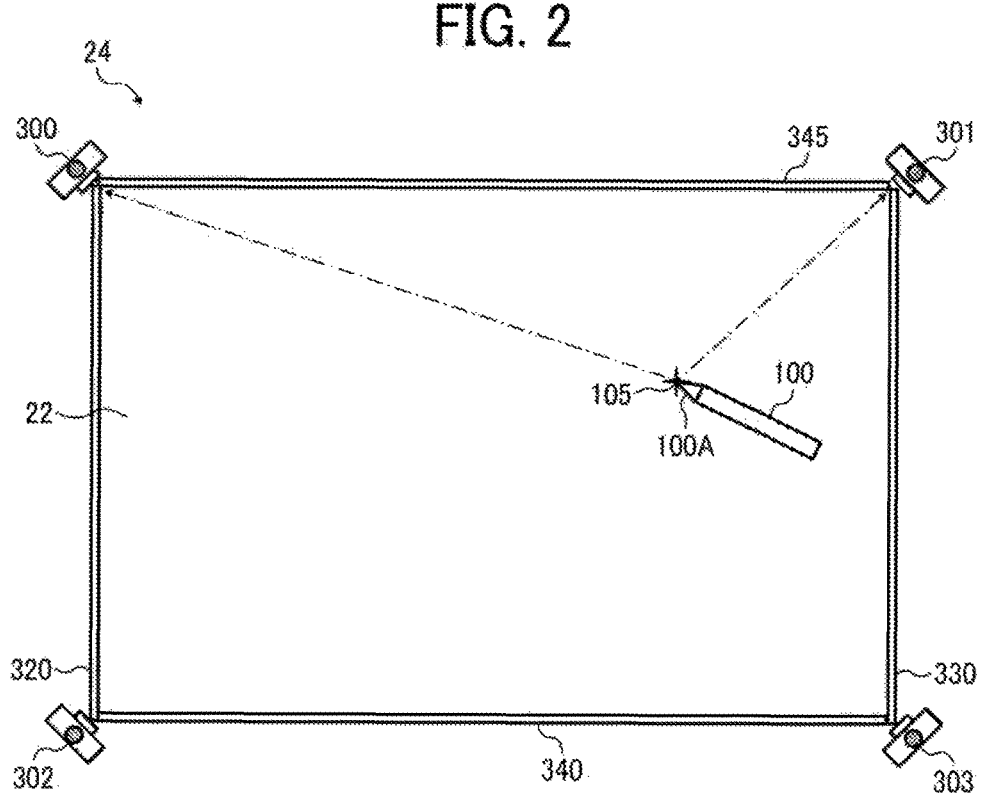
FIG. 2 is an illustration for describing a coordinate detecting apparatus illustrated in FIG. 1.

FIG. 2 illustrates the schematic configuration of the coordinate detecting apparatus 24.

As illustrated in FIG. 2, the coordinate detecting apparatus 24 includes four light-emitting and -receiving units 300, 301, 302, and 303, which are arranged near the four corners of the display surface 22, and a control unit 400 (see FIG. 8) that controls the light-emitting and -receiving units. Although the light-emitting and -receiving units have substantially the same configuration here, the light-emitting and -receiving units may have different configurations.

Figure 3:
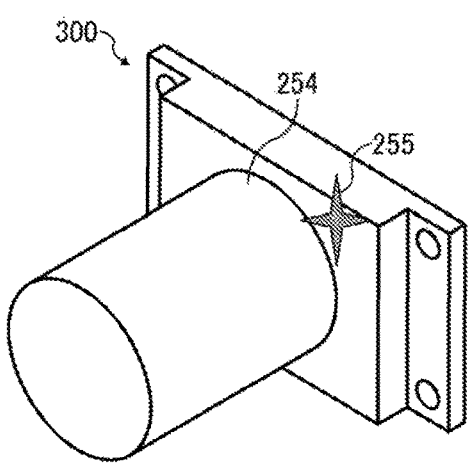
FIG. 3 is a diagram illustrating the configuration of a light-emitting and -receiving unit included in the coordinate detecting apparatus.

As illustrated in FIG. 3, the light-emitting and -receiving units each include a light-emitting part 255 that emits infrared rays, an optical system that is placed on an optical path of the light from the light-emitting part 255 and that emits the light as light that progresses while spreading in a fan shape along the display surface 22, and a light-receiving part 254 that receives infrared rays. Examples of the light-emitting part include, for example, a laser diode (LD), a Vertical Cavity Surface Emitting LASER (VCSEL), and a light-emitting diode (LED).

Referring back to FIG. 2, retroreflective members 320, 330, 340, and 345 are located on the four sides of the display surface 22, with their retroreflective sides facing toward the center of the display surface 22. The retroreflective members are members that have the characteristics of reflecting incident light in the same direction, regardless of the incident angle.

The light-emitting and -receiving unit 300, located near the upper left-hand corner of the display surface 22, is capable of emitting infrared rays along the display surface 22. The light-emitting range of the light-emitting and -receiving unit 300 is the entire area of the retroreflective member 330, which is on the right side, and the retroreflective member 340, which is on the lower side.

The light-emitting and -receiving unit 301, located near the upper right-hand corner of the display surface 22, is capable of emitting infrared rays along the display surface 22. The light-emitting range of the light-emitting and -receiving unit 301 is the entire area of the retroreflective member 320, which is on the left side, and the retroreflective member 340, which is on the lower side.

The light-emitting and -receiving unit 302, located near the lower left-hand corner of the display surface 22, is capable of emitting infrared rays along the display surface 22. The light-emitting range of the light-emitting and -receiving unit 302 is the entire area of the retroreflective member 330, which is on the right side, and the retroreflective member 345, which is on the upper side.

The light-emitting and -receiving unit 303, located near the lower right-hand corner of the display surface 22, is capable of emitting infrared rays along the display surface 22. The light-emitting range of the light-emitting and -receiving unit 303 is the entire area of the retroreflective member 320, which is on the left side, and the retroreflective member 345, which is on the upper side.

The control unit 400 controls the light-emitting parts of the four light-emitting and -receiving units 300, 301, 302, and 303, and obtains the coordinates of the position of input made with a designation input unit (pen-type input device or non-light-emitting body) on the basis of the outputs (output signals) of the light-receiving parts of at least two light-emitting and -receiving units. The control unit 400 is configured including, for example, a central processing unit (CPU) and a chipset.

When nothing is in contact with or is close to the display surface 22, infrared rays emitted from the light-emitting parts of the light-emitting and -receiving units 300, 301, 302, and 303 are reflected by the retroreflective members 320, 330, 340, and 345, and the reflected light rays are respectively received by the light-receiving parts of the light-emitting and -receiving units 300, 301, 302, and 303.

Figure 4:
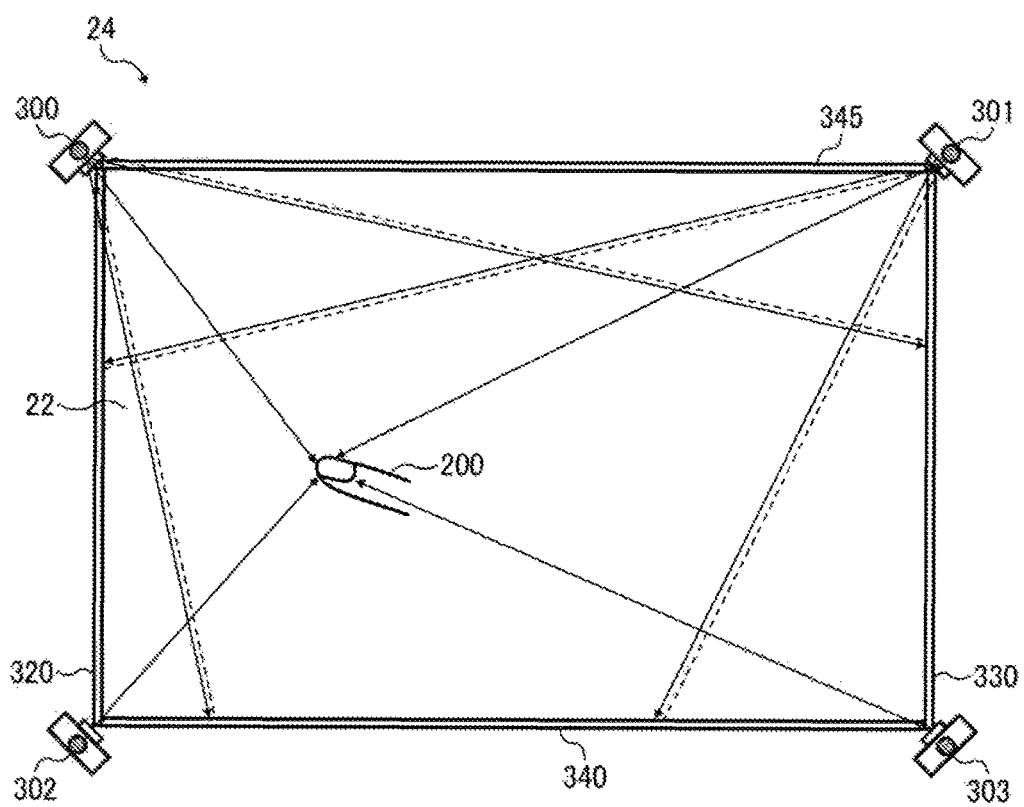
FIG. 4 is an illustration for describing the coordinate detecting apparatus.

As illustrated in FIG. 4, when a non-light-emitting body 200 such as a finger or a pointing stick comes into contact with or becomes close to the display surface 22, some of the infrared rays emitted from the light-emitting and -receiving units 300, 301, 302, and 303 are blocked at the place of contact or the place of proximity.

From output signals of the light-receiving parts of two light-emitting and -receiving units that are adjacent along the outer edge of the display surface 22, the angles of tilt of straight lines passing the light-emitting positions of the two light-emitting and -receiving units and the place where some of the infrared rays are blocked (input position), with respect to the horizontal or vertical side of the display surface 22, are obtained, and a combination of the angles of tilt are converted to the XY coordinates using the formula of triangulation, thereby obtaining the coordinates of the input position.

Referring back to FIG. 2, when the movable pen tip 120 of the pen-type input device 100 comes into contact with the display surface 22, the contact is detected by displacement of the movable pen tip 120 due to the contact force. When the contact is detected, a light-emitting element 105 mounted at the tip of the movable pen tip 120 emits infrared rays, and the infrared rays enter the light-receiving parts of the light-emitting and -receiving units 300, 301, 302, and 303. At this time, the coordinates can be converted to the XY coordinates using the formula of triangulation on the basis of the outputs (light-receiving amounts) of the light-receiving parts of two light-emitting and -receiving units that are adjacent along the outer edge of the display surface 22. Accordingly, the coordinates of the input position at the time of writing performed with the pen-type input device 100 on the display surface 22 can be obtained.

When the movable pen end 130 of the pen-type input device 100 comes into contact with the display surface 22, the contact is detected by displacement of the movable pen end 130 due to the contact force. When the contact is detected, a light-emitting element 105 mounted at the tip of the movable pen end 130 emits infrared rays, and the infrared rays enter the light-receiving parts of the light-emitting and -receiving units 300, 301, 302, and 303. At this time, the coordinates can be converted to the XY coordinates using the formula of triangulation on the basis of the outputs (light-receiving amounts) of the light-receiving parts of two light-emitting and -receiving units that are adjacent along the outer edge of the display surface 22. Accordingly, the coordinates of the input position at the time of erasing performed with the pen-type input device 100 on the display surface 22 can be obtained.

Figure 5:
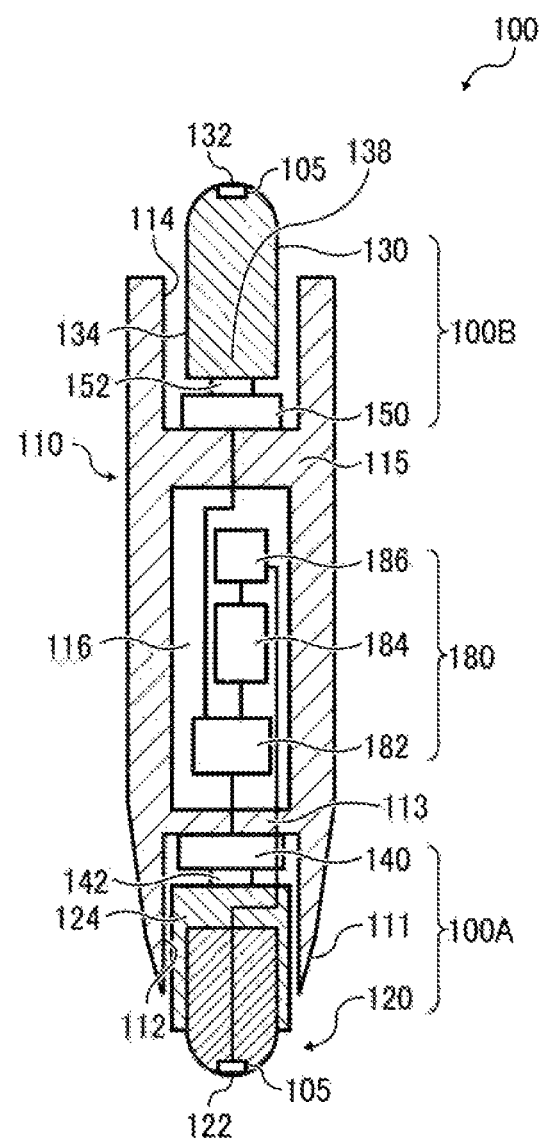
FIG. 5 is a vertical cross-sectional view for describing the configuration of a pen-type input device.

FIG. 5 is a vertical cross-sectional view of the pen-type input device 100. As illustrated in FIG. 5, the pen-type input device 100 is provided with a writing unit 100A at one of two ends of a pen main body 110 having a cylindrical shape, and an erasing unit 100B at the other end of the pen main body 110. The writing unit 100A includes the movable pen tip 120 and a pen tip detection switch 140 in a tip concave portion 112 of the pen main body 110. The erasing unit 100B includes the movable pen end 130 and a pen end detection switch 150 in a rear concave portion 114 of the pen main body 110.

The pen tip detection switch 140 and the pen end detection switch 150 are so-called push switches and respectively include movable portions 142 and 152 protruding in an axial direction. The movable portions 142 and 152 are separated with a minute gap from the movable pen tip 120 and the movable pen end 130, respectively. Thus, the movable portions 142 and 152 are pushed when the movable pen tip 120 and the movable pen end 130 move more than or equal to a certain distance (more than or equal to the above-mentioned minute gap) in the axial direction, and output detection signals as the movable portions 142 and 152 move through a movable range (distance in the axial direction) where the switches are turned from off to on.

First ends of the pen tip detection switch 140 and the pen end detection switch 150 are respectively fixed to partitions 113 and 115 formed in inner parts of the tip concave portion 112 and the rear concave portion 114. The pen tip detection switch 140 and the pen end detection switch 150 contain springs that press the movable portions 142 and 152, protruding from second ends of the pen tip detection switch 140 and the pen end detection switch 150, to the off positions.

The pen-type input device 100 includes a transmission circuit unit (transmitter) 180 contained in an internal space 116 of the pen main body 110. The transmission circuit unit 180 includes a signal input part 182, a signal processor 184, and a detection signal transmitter 186.

The signal input part 182 receives detection signals from the pen tip detection switch 140 and the pen end detection switch 150. The signal processor 184 converts a detection signal input via the signal input part 182 to a drive signal for driving the light-emitting element 105 of the movable pen tip 120 or the movable pen end 130, and sends the drive signal to the detection signal transmitter 186. The detection signal transmitter 186 applies the drive signal to the light-emitting element 105, and causes the light-emitting element 105 to emit infrared rays serving as a wireless signal (writing detection signal or erasing detection signal).

That is, the pen-type input device 100 emits infrared rays when the movable pen tip 120 or the movable pen end 130 comes into contact with the display surface 22.

Because the size expansion can be easily done by changing the length of the retroreflective members 320, 330, 340, and 345, the system is applicable not only to flat panels of various sizes, but also to projection apparatuses such as projectors.

Figure 6:
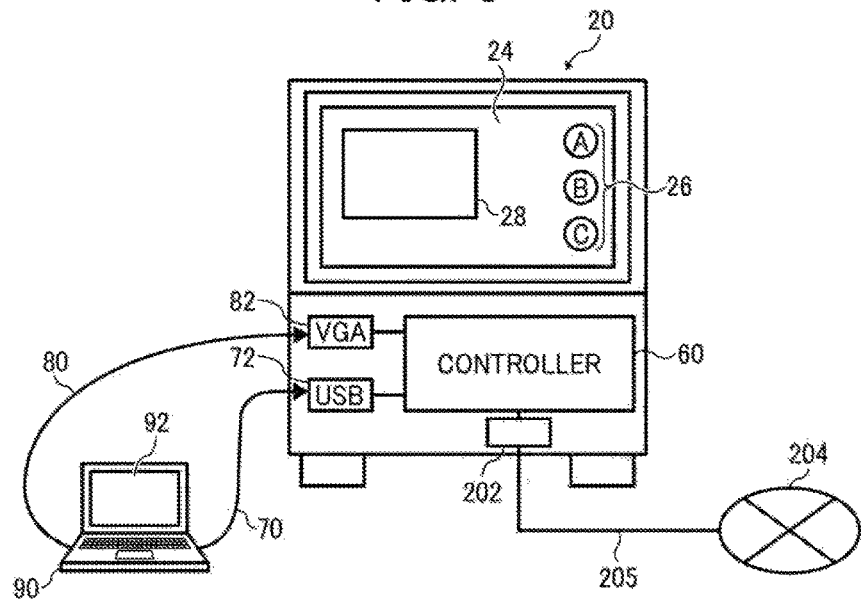
FIG. 6 is a schematic illustration of main sections of the electronic information board system.
Figure 7:
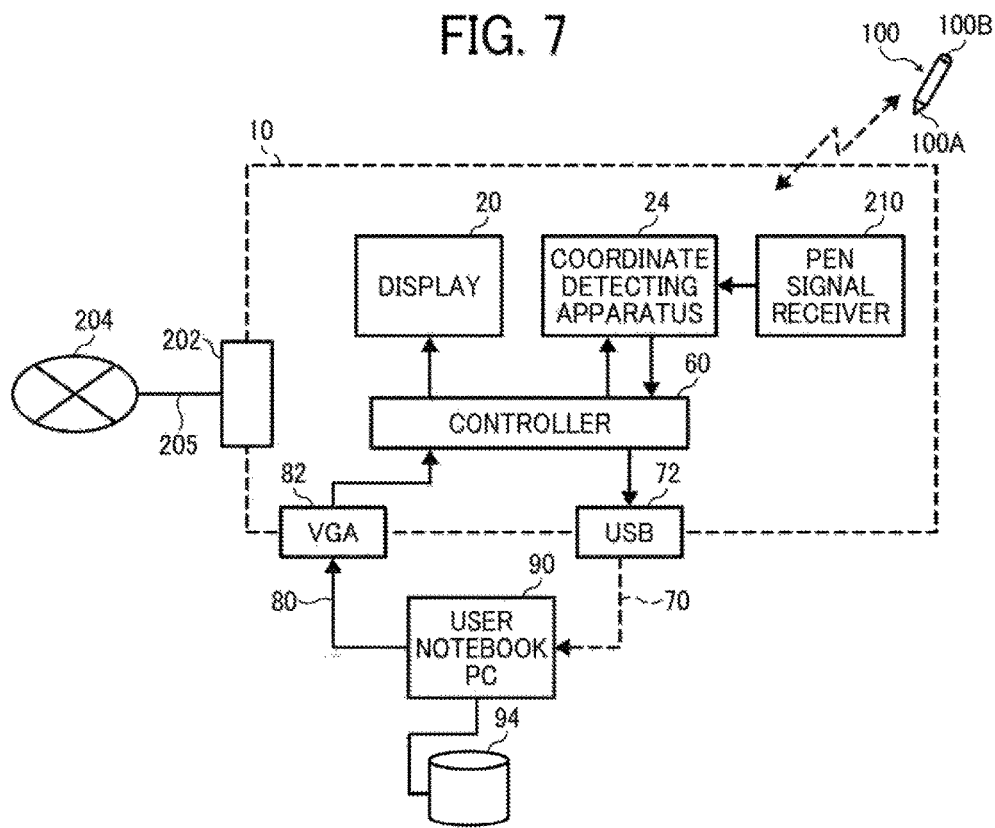
FIG. 7 is a block diagram illustrating the configuration of a control system of the electronic information board system.

FIG. 6 is a schematic illustration of main sections of the electronic information board system 10. FIG. 7 is a block diagram illustrating the configuration of a control system of the electronic information board system 10.

As is clear from FIGS. 6 and 7, the display 20 is under control of the controller 60 and displays, on the display surface 22, images taken from various screen operation units 26, whose inputs are operated, and a user personal computer (PC) 90.

The controller 60 also includes a Universal Serial Bus (USB) socket 72, to which a USB cable 70 is connected, and an input socket 82, to which cables 80 such as a Video Graphics Array (VGA) cable, a High-Definition Multimedia Interface (HDMI) (registered trademark) cable, and a display port are connected.

The user PC 90 is connected to the controller 60 via the USB socket 72 and the input socket 82, to which signals from the VGA cable, HDMI cable (registered trademark), and display port are input.

The user PC 90 includes a storage 94 (see FIG. 7) including a magnetic disk drive or the like.

The storage 94 stores various items of content and programs such as content display application software.

When an operator selects a desired item of content from the items of content stored in the storage 94, the selected item of content is displayed on a monitor 92 (see FIG. 6).

When image data displayed on the monitor 92 of the user PC 90 is transferred via the USB cable 70 and the VGA cable 80, the controller 60 displays the same image as the image data displayed on the monitor 92 on a user PC screen 28 of the display 20.

The controller 60 is also connected to a network 204 such as the Internet or a local area network (LAN) via a communication line 205 such as optical fibers and a network socket 202.

Figure 8:
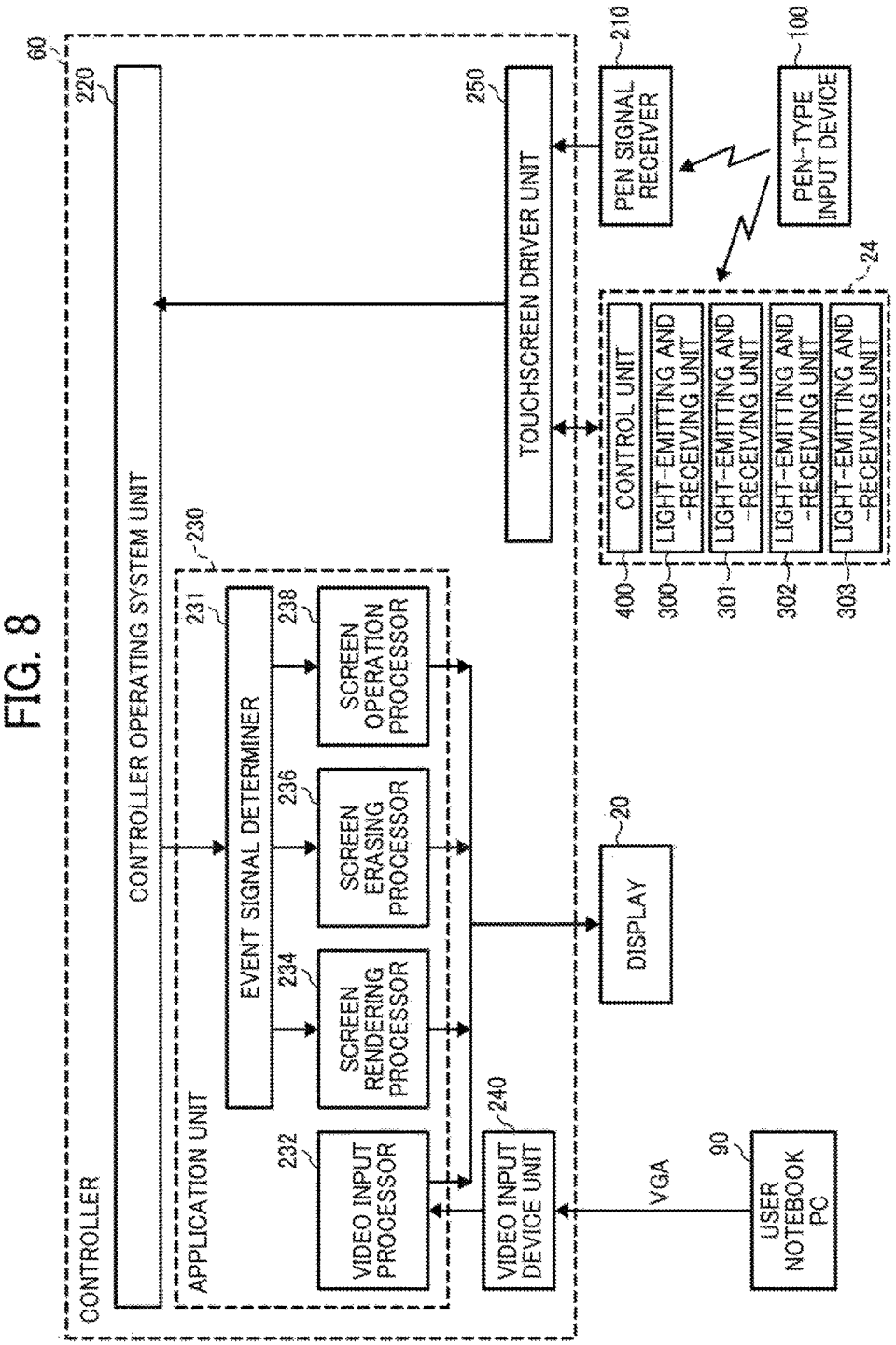
FIG. 8 is a block diagram illustrating the configuration and functions of a controller of the control system, and the coordinate detecting apparatus.

FIG. 8 is a block diagram illustrating the configuration of the controller 60 of the electronic information board system 10. As illustrated in FIG. 8, the controller 60 of the electronic information board system 10 includes a controller operating system unit 220, an application unit 230, a video input device unit 240, and a touchscreen driver unit 250.

The application unit 230 includes an event signal determiner 231, a video input processor 232, an image rendering processor 234, a screen erasing processor 236, and a screen operation processor 238.

The controller operating system unit 220 is a main controller that manages and executes control processing performed by the controller 60.

The application unit 230 performs control processing to generate the entire image displayed on the display surface 22 of the display 20, control processing to display an image on the user PC screen 28, and, when the movable pen tip 120 or the movable pen end 130 of the pen-type input device 100 comes into contact with the display surface 22 and a writing detection signal or an erasing detection signal is detected, and when input (contact or proximity) made with a non-light-emitting body such as a finger or a pointing stick on the display surface 22 is detected, control processing to display or erase drawn or written graphics or text.

The event signal determiner 231 monitors an event signal input from the controller operating system unit 220 and performs control processing in accordance with the input event signal.

The video input processor 232 performs control processing to display an image input from the user PC 90 on the user PC screen 28 of the display surface 22.

The image rendering processor 234 generates hand-drawn graphics based on coordinate information input from the coordinate detecting apparatus 24 via the event signal determiner 231, superimposes the hand-drawn graphics on an already-displayed image, and displays the result image on the display surface 22 of the display 20.

The screen erasing processor 236 generates graphics in a background color of a currently-displayed image on the basis of coordinate information input from the coordinate detecting apparatus 24 via the event signal determiner 231, superimposes the graphics in the background color on an already-displayed image, and displays the result image on the display surface 22 of the display 20.

Accordingly, the graphics in the background color is superimposed on the hand-drawn graphics displayed on the display 20, and the hand-drawn graphics on the display surface 22 seem to be erased.

The screen operation processor 238 converts coordinate information (coordinate signal) input from the coordinate detecting apparatus 24 to a pointing device signal such as a mouse event, and performs processing based on an on/off operation of the screen operation unit 26 displayed on the display surface 22 of the display 20.

The screen operation processor 238 transfers coordinate information of a position with which the pen-type input device 100 comes into contact, which is detected by the light-emitting and -receiving units 300, 301, 302, and 303 of the coordinate detecting apparatus 24, as a mouse down event along with the coordinate values to the controller operating system unit 220.

When the pen-type input device 100 is moved while being in contact with the display surface 22 of the coordinate detecting apparatus 24, the screen operation processor 238 transfers this movement as a mouse up event along with the coordinate values to the controller operating system unit 220.

The touchscreen driver unit 250 converts a writing detection signal or an erasing detection signal input from the pen-type input device 100 via the pen signal receiver 210, and a coordinate signal input from the coordinate detecting apparatus 24 to a certain event signal and transfers the certain event signal to the controller operating system unit 220.

Figure 9:
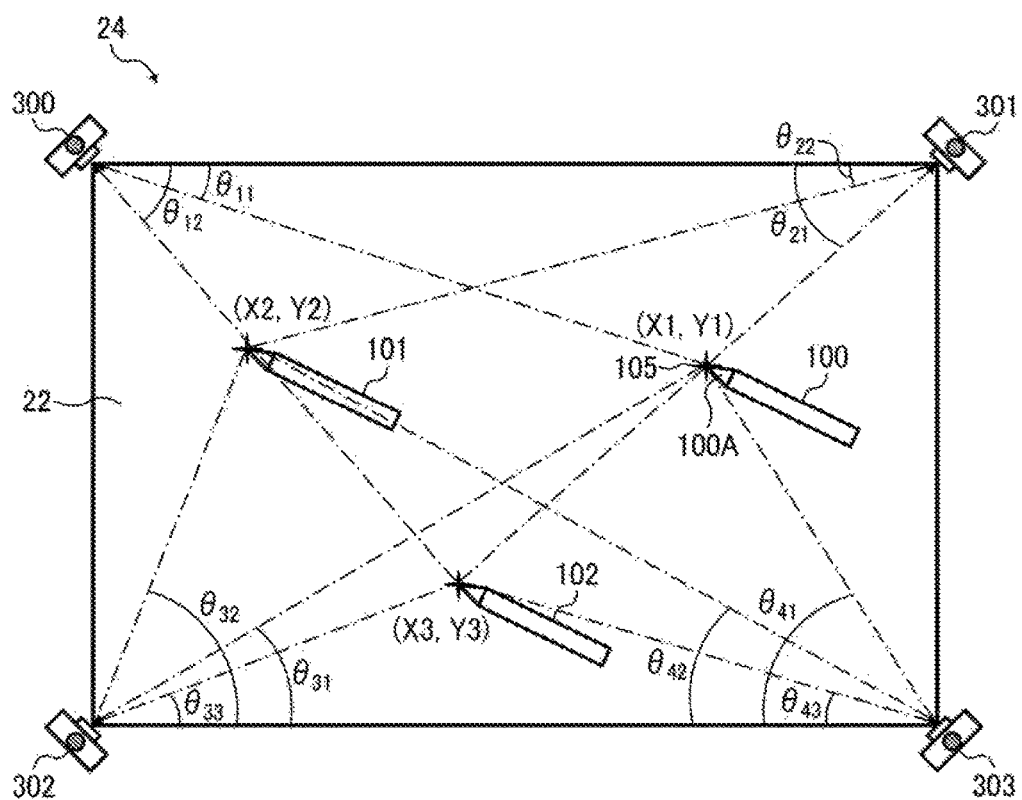
FIG. 9 is an illustration for describing a method (coordinate detecting method) for detecting the coordinates of the position of input made with pen-type input devices.

FIG. 9 is a diagram illustrating detection of input made with pen-type input devices 100, 101, and 102 where light-emitting elements are mounted on pen main bodies, and the configuration for input position detection. The individual pen-type input devices have substantially the same configuration. Here, the light-emitting parts of the four light-emitting and -receiving units 300, 301, 302, and 303 are turned off. The light-emitting position of the light-emitting and -receiving unit 300 and the positions of input made with the pen-type input devices 101 and 102 are on the same straight line, and the light-emitting position of the light-emitting and -receiving unit 301 and the positions of input made with the pen-type input devices 100 and 102 are on the same straight line.

When the movable pen tips of the individual pen-type input devices come into contact with the display surface 22, infrared rays emitted from the light-emitting elements of the pen-type input devices enter the light-emitting and -receiving units 300, 301, 302, and 303. Accordingly, the amounts of light of infrared rays increase at positions where the pen-type input devices are in contact with the display surface 22 (input positions or touched positions), and angles for estimating the positions can be obtained from the outputs of the light-receiving parts of at least two light-emitting and -receiving units. The output of each light-receiving part is also referred to as the "amount of received light".

Figure 10:
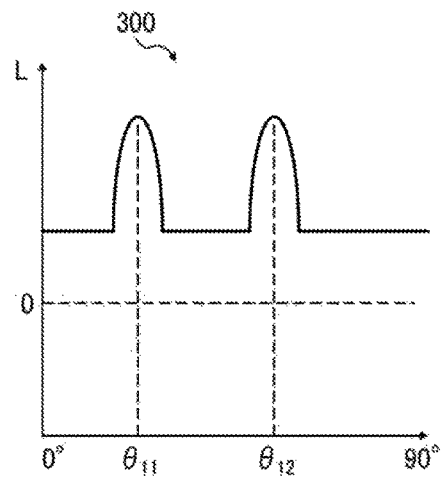
FIG. 10 includes graphs illustrating the amounts of light received by four light-emitting and -receiving units when three pen-type input devices are emitting light.
Figure 10:
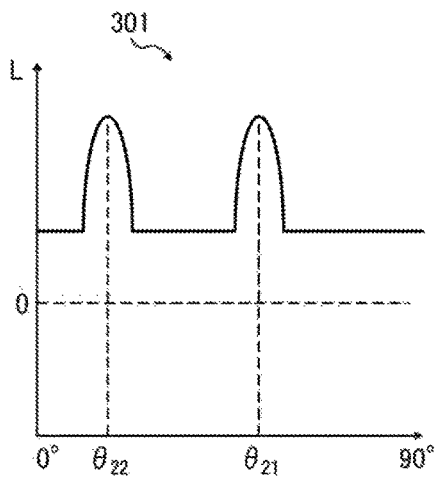
Figure 10:
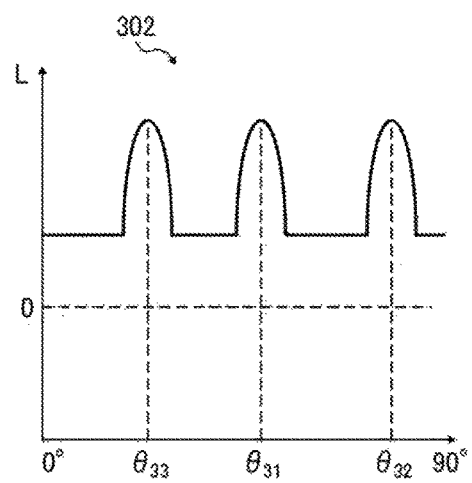
Figure 10:
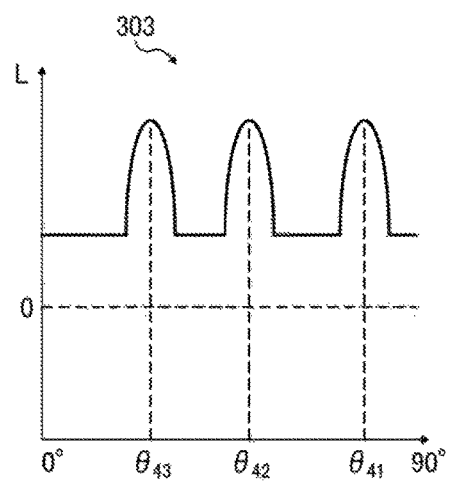

Upper graphs illustrated in FIG. 10 are graphs illustrating the amounts of light detected by the light-emitting and -receiving units 300 and 301 when the light-emitting elements of the three pen-type input devices 100, 101, and 102 arranged as illustrated in FIG. 9 emit light.

As is clear from the upper graphs illustrated in FIG. 10, when each light-emitting element emits infrared rays, the amount of light at that position strikingly increases. Accordingly, the fact that a plurality of pen-type input devices are in contact with the display surface 22 can be detected.

Now, it is assumed that $(\theta_{11}, \theta_{21})$ is the only combination of angles that can be obtained from the outputs of the light-receiving parts of the light-emitting and -receiving units 300 and 301. In this case, it can be estimated that only the light-emitting element 105 of the pen-type input device 100 is emitting light, that is, only the pen-type input device 100 is making input. With triangulation using $(\theta_{11}, \theta_{21})$, the coordinates (X1, Y1) of the input position (touched position) can be uniquely obtained.

However, when the light-emitting elements of the three pen-type input devices 100, 101, and 102 are actually emitting light, there are a total of four combinations $(\theta_{11}, \theta_{21})$, $(\theta_{11}, \theta_{22})$, $(\theta_{12}, \theta_{21})$, and $(\theta_{12}, \theta_{22})$ of angles that can be obtained from the outputs (the amounts of received light) of the light-receiving parts of the light-emitting and -receiving units 300 and 301. Thus, it is difficult to accurately estimate at which position, determined by a corresponding one of the combinations, each pen-type input device is making input. In FIG. 8, the pen-type input devices 100, 101, and 102 are actually making input at three positions determined by $(\theta_{11}, \theta_{21})$, $(\theta_{12}, \theta_{22})$, and $(\theta_{12}, \theta_{22})$. It is concerned that it may be mistakenly detected that a pen-type input device is making input at a position determined by, for example, $(\theta_{11}, \theta_{22})$, or it may be mistakenly detected that no pen-type input device is making input at a position determined by, for example, $(\theta_{12}, \theta_{21})$.

That is, the positions of input made with the three pen-type input devices 100, 101, and 102 illustrated in FIG. 9 may not be accurately estimated only from the amounts of light of the two light-emitting and -receiving units 300 and 301, which may result in detection errors.

Accordingly, it is preferable to estimate the positions of input made with the pen-type input devices using, in addition to the amounts of light received by the light-emitting and -receiving units 300 and 301, the amount of light received by at least one of the two light-emitting and -receiving units 302 and 303 illustrated in lower graphs of FIG. 10.

In this case, angle information for estimating the input positions can be increased by combining the angles obtained from the amounts of light received by the light-emitting and -receiving units 300 and 301 (see the upper graphs of FIG. 0) and the angles obtained by the amount of light received by at least one of the light-emitting and -receiving units 302 and 303 (see the lower graphs of FIG. 10). Accordingly, even when a plurality of pen-type input devices is simultaneously making input, their input positions can be accurately estimated, and their coordinates can be obtained.

For example, input made at three positions respectively corresponding to the combinations of angles $(\theta_{11}, \theta_{21}, \theta_{31})$, $(\theta_{12}, \theta_{22}, \theta_{32})$, and $(\theta_{12}, \theta_{21}, \theta_{33})$ obtained from the three light-emitting and -receiving units 300, 301, and 302 can be accurately detected. Furthermore, triangulation is performed using the combinations of angles $(\theta_{11}, \theta_{21})$, $(\theta_{12}, \theta_{22})$, and $(\theta_{12}, \theta_{21})$ obtained from the two light-emitting and -receiving units 300 and 301, thereby obtaining the coordinates (X1, Y1), (X2, Y2), and (X3, Y3) of the corresponding input positions. As a result, the coordinates of the positions of input made with the three pen-type input devices 100, 101, and 102 can be accurately obtained. That is, the above-mentioned detection errors can be prevented.

For example, input made at three positions respectively corresponding to the combinations of angles $(\theta_{11}, \theta_{21}, \theta_{31}, \theta_{41})$, $(\theta_{12}, \theta_{22}, \theta_{32}, \theta_{42})$, and $(\theta_{12}, \theta_{21}, \theta_{33}, \theta_{43})$ obtained from the four light-emitting and -receiving units 300, 301, 302, and 303 can be accurately detected. Furthermore, triangulation is performed using the combinations of angles $(\theta_{11}, \theta_{21})$, $(\theta_{12}, \theta_{22})$, and $(\theta_{12}, \theta_{21})$ obtained from the two light-emitting and -receiving units 300 and 301, thereby obtaining the coordinates (X1, Y1), (X2, Y2), and (X3, Y3) of the corresponding input positions. As a result, the positions of input made with the three pen-type input devices 100, 101, and 102 can be accurately obtained. That is, the above-mentioned detection errors can be further prevented.

In the case of using combinations of angles obtained from four light-emitting and -receiving units, even when four pen-type input devices are simultaneously making input, the coordinates of their input positions can also be obtained.

In the above-mentioned two examples, triangulation (calculation of the coordinates of the input positions) is performed on the basis of the amounts of light received by the two light-emitting and -receiving units 300 and 301. Alternatively, triangulation (calculation of the coordinates of the input positions) may be performed on the basis of the amounts of light received by the two light-emitting and -receiving units 300 and 302, the amounts of light received by the two light-emitting and -receiving units 302 and 303, or the amounts of light received by the two light-emitting and -receiving units 303 and 301. In short, it is preferable to perform triangulation based on the amounts of light received by two light-emitting and -receiving units that are adjacent along the display surface 22.

The above description clarifies that the greater the number of light-emitting and -receiving units arranged along the outer edge of the display surface 22, the greater the number of pen-type input devices whose coordinates of the input positions can be simultaneously obtained. If infrared rays emitted from a light-emitting element of a pen-type input device are blocked by, for example, a hand, the position of input made with this pen-type input device can be estimated using angles obtained from any two of light-emitting and -receiving units.

If more light-emitting and -receiving units are to be added, one or more light-emitting and -receiving units may be arranged near, for example, a position between vertices of the display surface 22.

Figure 11:
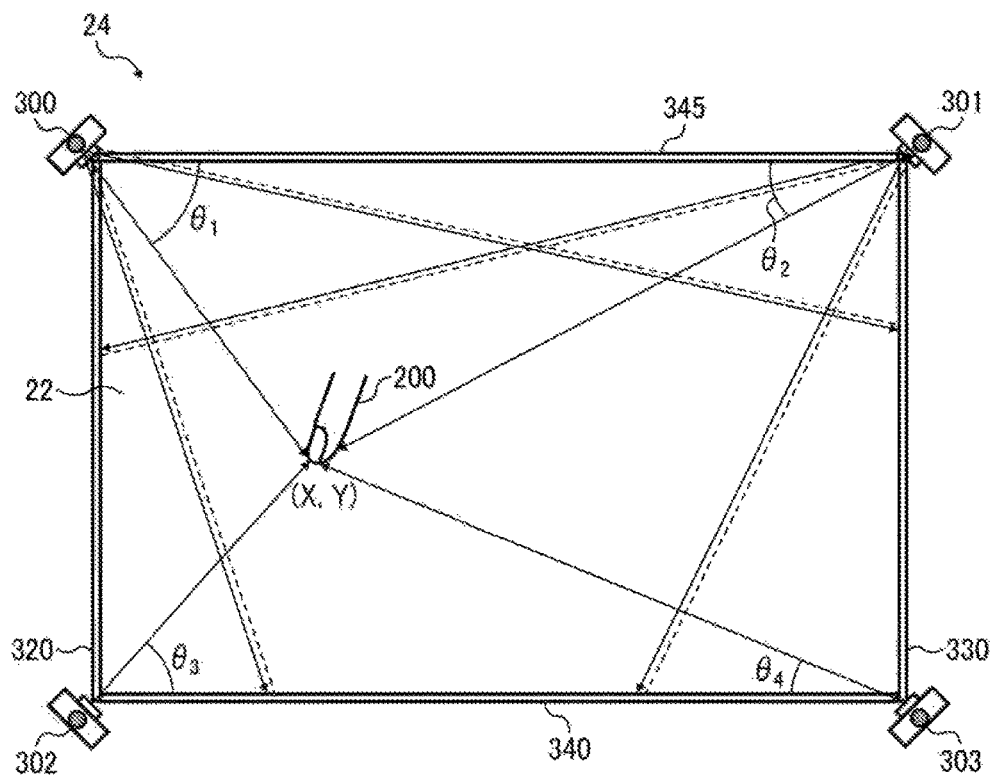
FIG. 11 is an illustration for describing a method (coordinate detecting method) for detecting the coordinates of the position of input made with a non-light-emitting body.

FIG. 11 is a diagram illustrating detection of input made with the non-light-emitting body 200 such as a finger or a pointing device, and the configuration for input position detection. Here, the light-emitting parts of the four light-emitting and -receiving units 300, 301, 302, and 303 are turned on.

Figure 12:
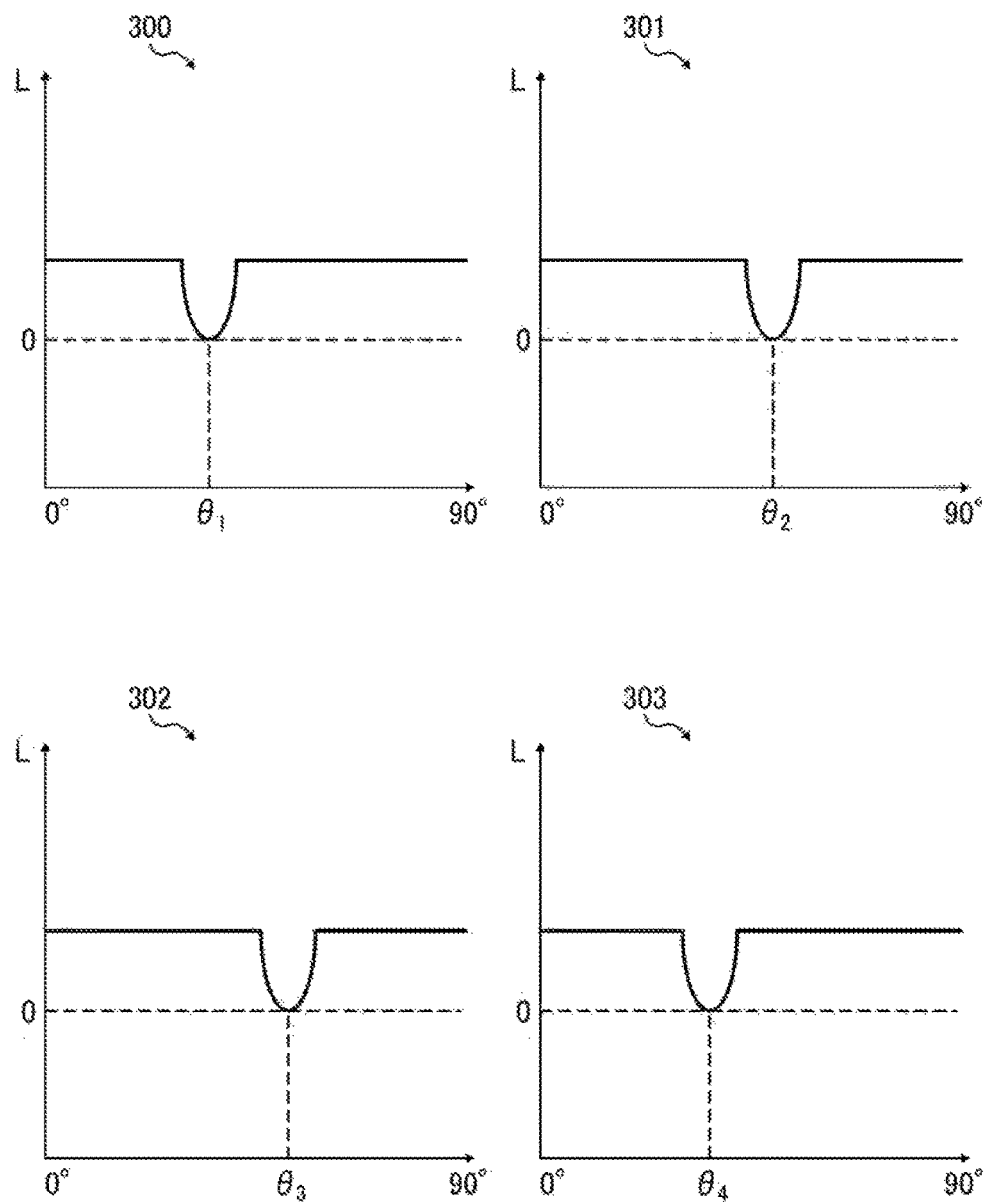
FIG. 12 includes graphs illustrating the amounts of light received by four light-emitting and -receiving units when light from the four light-emitting and -receiving units is blocked by a non-light-emitting body.

FIG. 12 includes graphs illustrating the amounts of light detected by the light-emitting and -receiving units 300, 301, 302, and 303 when infrared rays emitted from the light-emitting and -receiving units 300, 301, 302, and 303 are blocked by the non-light-emitting body 200 such as a finger.

The light-emitting and -receiving units 300, 301, 302, and 303 constantly emit infrared rays. The infrared rays from the individual light-emitting and -receiving units are reflected by the four retroreflective members 320, 330, 340, and 345 arranged on the four sides of the display surface 22, and return to the light-emitting and -receiving units.

When the optical path of infrared rays from a light-emitting and -receiving unit is blocked by the non-light-emitting body 200, the infrared rays do not return to the light-emitting and -receiving unit, and, as illustrated in FIG. 12, the amount of light decreases only in that portion. With triangulation using the angles $\theta_1$ and $\theta_2$ obtained from the amounts of light received by the light-emitting and -receiving units 300 and 301 or the angles $\theta_3$ and $\theta_4$ obtained from the amounts of light received by the light-emitting and -receiving units 302 and 303, the coordinates (X, Y) of the position of input made with the non-light-emitting body 200 can be obtained.

In this example, triangulation (calculation of the coordinates of the input position) is performed on the basis of the amounts of light received by the two light-emitting and -receiving units 300 and 301 or the amounts of light received by the two light-emitting and -receiving units 303 and 304. Alternatively, triangulation (calculation of the coordinates of the input position) may be performed on the basis of the amounts of light received by the two light-emitting and -receiving units 300 and 302, the amounts of light received by the two light-emitting and -receiving units 302 and 303, or the amounts of light received by the two light-emitting and -receiving units 303 and 301.

Like the above-mentioned case of detecting the coordinates of the positions of input made with a plurality of pen-type input devices, even when a plurality of non-light-emitting bodies 200 simultaneously come into contact with or become close to the display surface 22, the positions of input made with the plurality of non-light-emitting bodies 200 can be accurately obtained using at least three of the angles $\theta_1$, $\theta_2$, $\theta_3$, and $\theta_4$ obtained from the amounts of light received by the four light-emitting and -receiving units 300, 301, 302, and 303.

First Example

Figure 13:
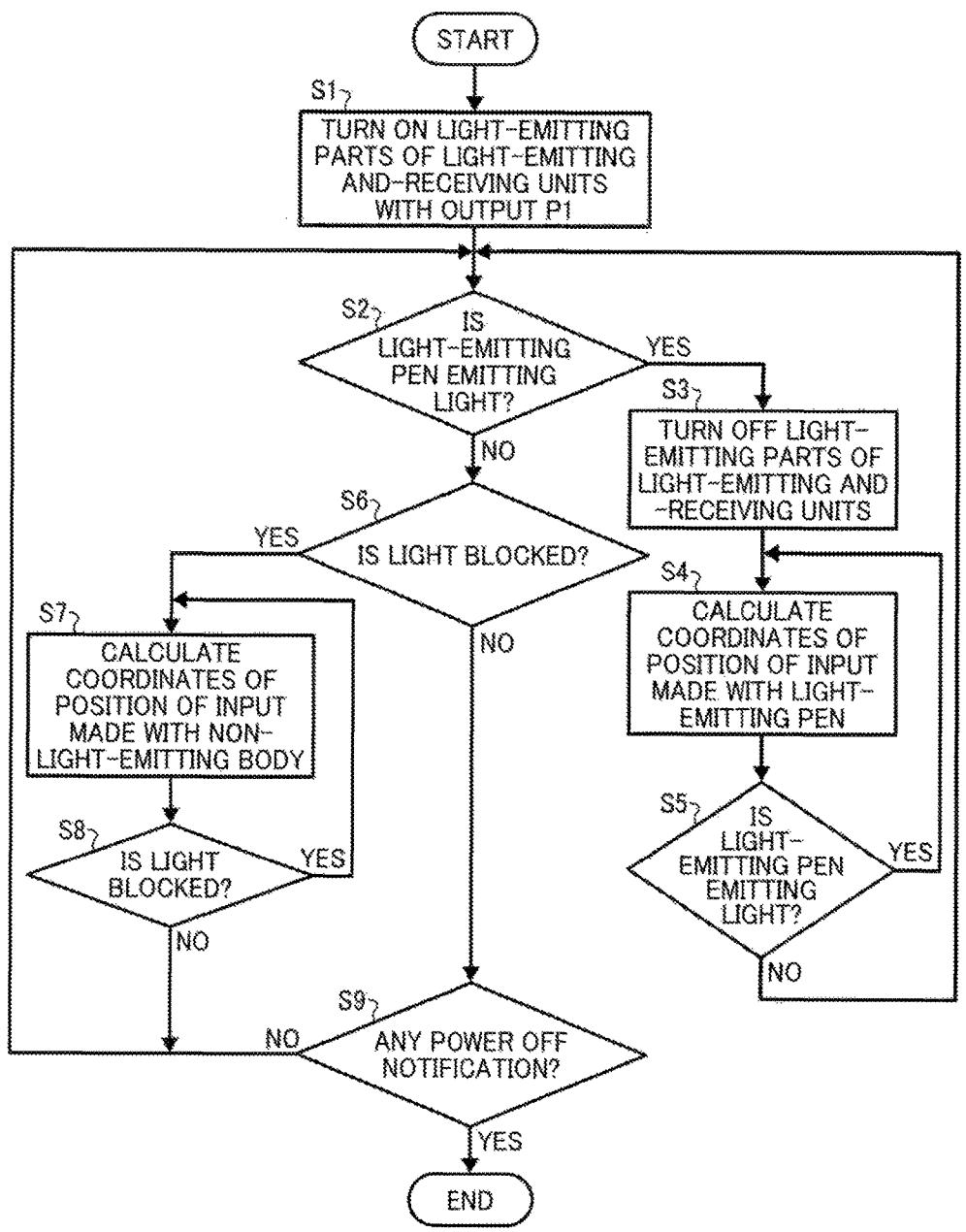
FIG. 13 is a flowchart for describing a coordinate detecting process according to a first example.

Hereinafter, a coordinate detecting process according to a first example using the coordinate detecting apparatus 24 according to the first embodiment will be described with reference to FIG. 13. The flowchart illustrated in FIG. 13 is based on a first processing algorithm executed by the control unit 400. The coordinate detecting process is started when the power of the electronic information board system 10 (hereinafter may simply be abbreviated as the "system") is turned on.

In the first step S1, the light-emitting parts of the individual light-emitting and -receiving units are turned on with an output P2. The output P2 is set to a magnitude with which input made with a non-light-emitting body and the coordinates of the input position are detectable, and also input made with a pen-type input device (hereinafter may also be referred to as a "light-emitting pen") is detectable.

When the output (the amount of emitted light) of a light-emitting part is too great, although input made with a non-light-emitting body is detectable, input made with a light-emitting pen is undetectable (the position of input made with the light-emitting pen (light-emitting point) is undistinguishable from the surroundings). In contrast, when the output (the amount of emitted light) of a light-emitting part is too small, although input made with a light-emitting pen is detectable, input made with a non-light-emitting body is undetectable (the position of input made with the non-light-emitting body (light blocked point) is undistinguishable from the surroundings).

In the next step S2, it is determined whether the light-emitting pen is emitting light. That is, it is determined whether the light-emitting pen is in contact with the display surface 22. Specifically, the outputs (the amounts of received light) of light-receiving parts of at least two light-emitting and -receiving units are monitored, and it is determined whether the amount of light on the display surface 22 locally increases. When the determination result indicates that there is such local increase, it is determined affirmative in step S2, and the process proceeds to step S3. In contrast, when the determination result indicates that there is no such local increase, it is determined negative in step S2, and the process proceeds to step S6.

In step S3, the light-emitting parts of the individual light-emitting and -receiving units are turned off. When step S3 is executed, the process proceeds to step S4.

In step S4, the coordinates of the position of input made with the light-emitting pen on the display surface 22 are calculated. Specifically, the coordinates of the position of input made with the light-emitting pen are calculated from a combination of angles obtained from the amounts of light received by two light-emitting and -receiving units that are adjacent along the display surface 22. When step S4 is executed, the process proceeds to step S5.

In step S5, it is determined whether the light-emitting pen is emitting light. That is, it is determined whether the light-emitting pen is in contact with the display surface 22.

When the determination is affirmative, the process returns to step S4; and when the determination is negative, the process returns to step S2.

In step S6, it is determined whether light from the light-emitting parts of the individual light-emitting and -receiving units is blocked by a non-light-emitting body. Specifically, the amounts of light received by at least two light-emitting and -receiving units are monitored, and it is determined whether the amount of light on the display surface 22 locally decreases. When the determination result indicates that there is such local decrease, it is determined affirmative in step S6, and the process proceeds to step S7. In contrast, when the determination result indicates that there is no such local decrease, it is determined negative in step S6, and the process proceeds to step S9.

In step S7, the coordinates of the position of input made with the non-light-emitting body on the display surface 22 are calculated. That is, the coordinates of the position at which light is blocked by the non-light-emitting body are detected. Specifically, the coordinates of the position of input made with the non-light-emitting body are calculated from a combination of angles obtained from the amounts of light received by two light-emitting and -receiving units that are adjacent along the display surface 22. When step S7 is executed, the process proceeds to step S8.

In step S8, it is determined whether light from the light-emitting parts of the individual light-emitting and -receiving units is blocked by the non-light-emitting body. Specifically, the amounts of light received by at least two light-emitting and -receiving units are monitored, and it is determined whether the amount of light on the display surface 22 locally decreases. When the determination result indicates that there is such local decrease, it is determined affirmative in step S8, and the process returns to step S7. In contrast, when the determination result indicates that there is no such local decrease, it is determined negative in step S8, and the process returns to step S2.

In step S9, it is determined whether to turn off the power of the system. Specifically, when a power off operation of the system is performed via the keyboard 30, a power off notification is sent from the controller 60 to the control unit 400. The determination here is affirmative when the control unit 400 receives a power off notification, and the flow ends. In contrast, the determination here is negative when the control unit 400 receives no power off notification, and the process returns to step S2.

Second Example

Figure 14:
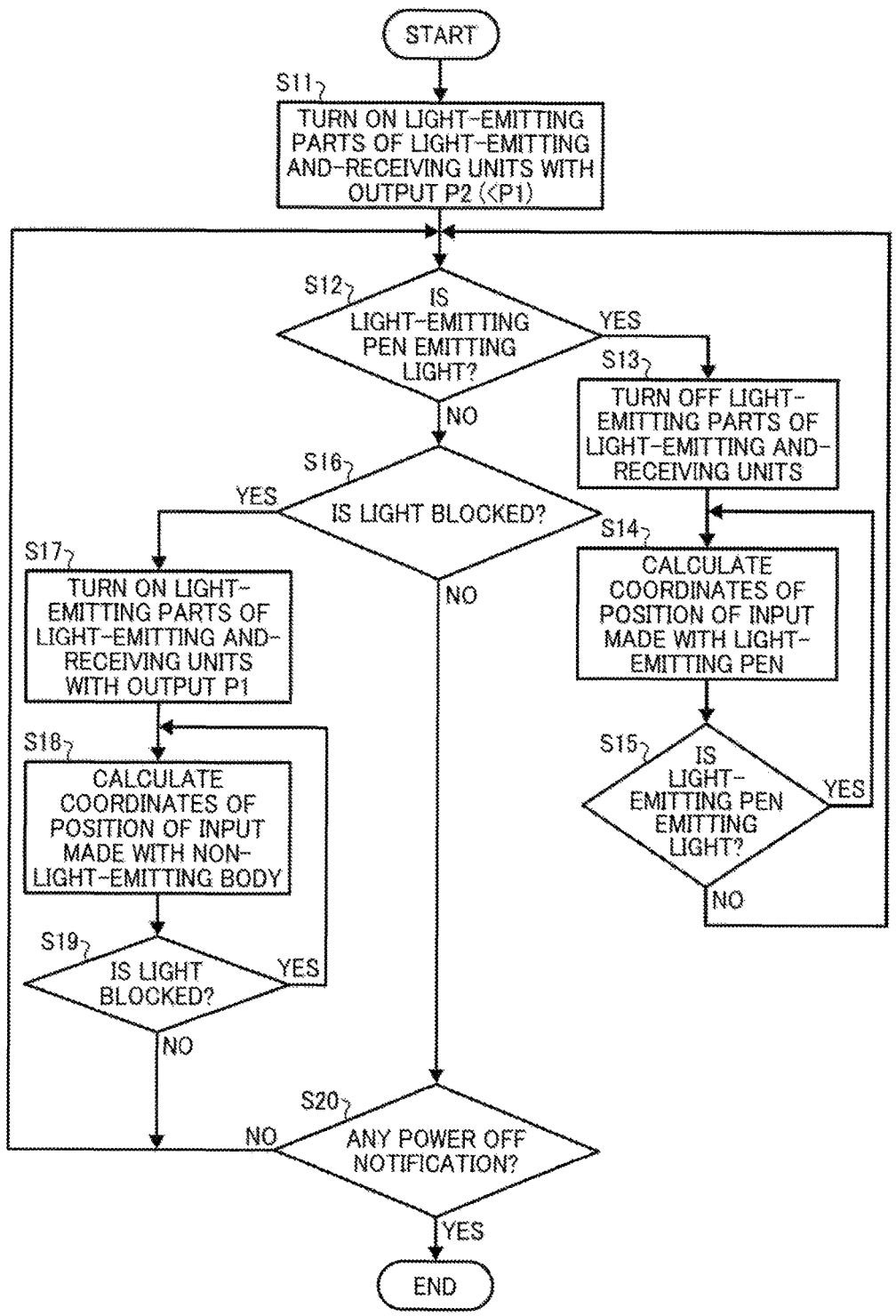
FIG. 14 is a flowchart for describing a coordinate detecting process according to a second example.

Hereinafter, a coordinate detecting process according to a second example using the coordinate detecting apparatus 24 according to the first embodiment will be described with reference to FIG. 14. The flowchart illustrated in FIG. 14 is based on a second processing algorithm executed by the control unit 400. The coordinate detecting process is started when the power of the electronic information board system 10 (hereinafter may simply be abbreviated as the "system") is turned on.

In the first step S11, the light-emitting parts of the individual light-emitting and -receiving units are turned on with an output P1 (<P2). The output P1 is set to a magnitude with which input made with both a non-light-emitting body and input made a light-emitting pen are both detectable.

In the next step S12, it is determined whether the light-emitting pen is emitting light. That is, it is determined whether the light-emitting pen is in contact with the display surface 22. Specifically, the amounts of light received by at least two light-emitting and -receiving units are monitored, and it is determined whether the amount of light on the display surface 22 locally increases. When the determination result indicates that there is such local increase, it is determined affirmative in step S12, and the process proceeds to step S13. In contrast, when the determination result indicates that there is no such local increase, it is determined negative in step S12, and the process proceeds to step S16.

In step S13, the light-emitting parts of the individual light-emitting and -receiving units are turned off. When step S13 is executed, the process proceeds to step S14.

In step S14, the coordinates of the position of input made with the light-emitting pen on the display surface 22 are calculated. Specifically, the coordinates of the position of input made with the light-emitting pen are calculated from a combination of angles obtained from the amounts of light received by two light-emitting and -receiving units that are adjacent along the display surface 22. When step S14 is executed, the process proceeds to step S15.

In step S15, it is determined whether the light-emitting pen is emitting light. That is, it is determined whether the light-emitting pen is in contact with the display surface 22. When the determination is affirmative, the process returns to step S14; and when the determination is negative, the process returns to step S12.

In step S16, it is determined whether light from the light-emitting parts of the individual light-emitting and -receiving units is blocked by the non-light-emitting body. Specifically, the amounts of light received by at least two light-emitting and -receiving units are monitored, and it is determined whether the amount of light on the display surface 22 locally decreases. When the determination result indicates that there is such local decrease, it is determined affirmative in step S16, and the process proceeds to step S17. In contrast, when the determination result indicates that there is no such local decrease, it is determined negative in step S16, and the process proceeds to step S20.

In step S17, the light-emitting parts of the individual light-emitting and -receiving units are turned on with the output P2. That is, the outputs of the light-emitting parts of the individual light-emitting and -receiving units are increased from P1 to P2. When step S17 is executed, the process proceeds to step S18.

In step S18, the coordinates of the position of input made with the non-light-emitting body on the display surface 22 are calculated. That is, the coordinates of the position at which light is blocked by the non-light-emitting body are detected. Specifically, the coordinates of the position of input made with the non-light-emitting body are calculated from a combination of angles obtained from the amounts of light received by two light-emitting and -receiving units that are adjacent along the display surface 22. When step S18 is executed, the process proceeds to step S19.

In step S19, it is determined whether light from the light-emitting parts of the individual light-emitting and -receiving units is blocked by the non-light-emitting body. Specifically, the amounts of light received by at least two light-emitting and -receiving units are monitored, and it is determined whether the amount of light on the display surface 22 locally decreases. When the determination result indicates that there is such local decrease, it is determined affirmative in step S19, and the process returns to step S18. In contrast, when the determination result indicates that there is no such local decrease, it is determined negative in step S19, and the process returns to step S12.

In step S20, it is determined whether to turn off the power of the system. Specifically, when a power off operation of the system is performed via the keyboard 30, a power off notification is sent from the controller 60 to the control unit 400. The determination here is affirmative when the control unit 400 receives a power off notification, and the flow ends. In contrast, the determination here is negative when the control unit 400 receives no power off notification, and the process returns to step S12.

In the above-described first and second examples, the coordinates of the position of input made with the light-emitting pen are calculated while the light-emitting parts of the individual light-emitting and -receiving units are turned off. Alternatively, the coordinates of the position of input made with the light-emitting pen may be calculated while the light-emitting parts of the individual light-emitting and -receiving units are turned on, as will be described in some modifications described below.

First Modification

Figure 15:
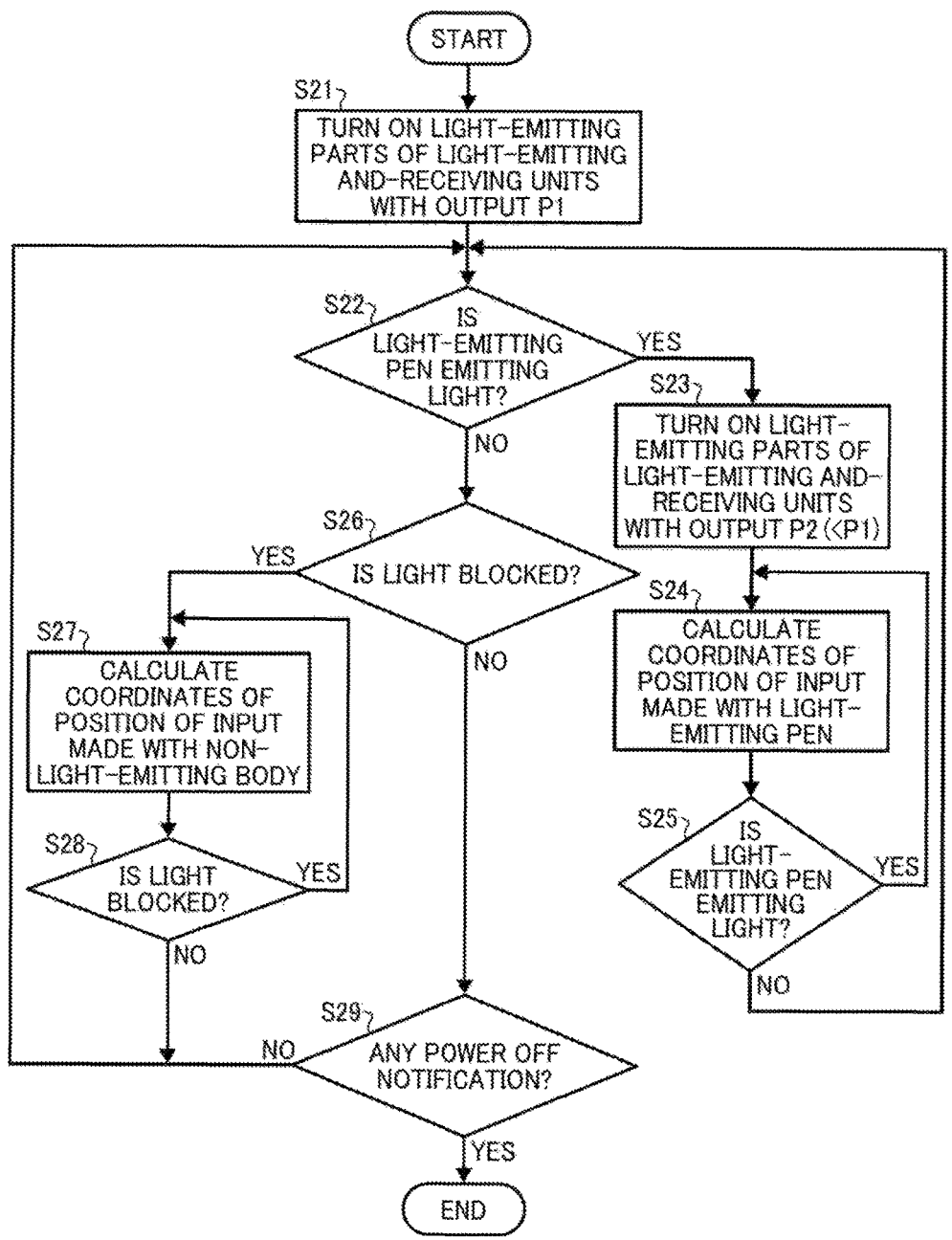
FIG. 15 is a flowchart for describing a coordinate detecting process according to a first modification.

Hereinafter, a coordinate detecting process according to a first modification using the coordinate detecting apparatus 24 according to the first embodiment will be described with reference to FIG. 15. The flowchart illustrated in FIG. 15 is based on a third processing algorithm executed by the control unit 400. The coordinate detecting process is started when the power of the electronic information board system 10 (hereinafter may simply be abbreviated as the "system") is turned on.

In the first step S21, the light-emitting parts of the individual light-emitting and -receiving units are turned on with the output P1. The output P1 is set to a magnitude with which input made with a non-light-emitting body and the coordinates of the input position are detectable, and also input made with a light-emitting pen is detectable.

In the next step S22, it is determined whether the light-emitting pen is emitting light. That is, it is determined whether the light-emitting pen is in contact with the display surface 22. Specifically, the outputs (the amounts of received light) of light-receiving parts of at least three light-emitting and -receiving units are monitored, and it is determined whether the amount of light on the display surface 22 locally increases. When the determination result indicates that there is such local increase, it is determined affirmative in step S22, and the process proceeds to step S23. In contrast, when the determination result indicates that there is no such local increase, it is determined negative in step S22, and the process proceeds to step S26.

In step S23, the light-emitting parts of the individual light-emitting and -receiving units are turned on with the output P2 (<P1). That is, the outputs of the light-emitting parts of the individual light-emitting and -receiving units are decreased from P1 to P2. When step S23 is executed, the process proceeds to step S24. It is preferable that P2 be as small as possible.

In step S24, the coordinates of the position of input made with the light-emitting pen on the display surface 22 are calculated. Specifically, the coordinates of the position of input made with the light-emitting pen are calculated from a combination of angles obtained from the amounts of light received by two light-emitting and -receiving units that are adjacent along the display surface 22. When step S24 is executed, the process proceeds to step S25.

In step S25, it is determined whether the light-emitting pen is emitting light. That is, it is determined whether the light-emitting pen is in contact with the display surface 22. When the determination is affirmative, the process returns to step S24; and when the determination is negative, the process returns to step S22.

In step S26, it is determined whether light from the light-emitting parts of the individual light-emitting and -receiving units is blocked by the non-light-emitting body. Specifically, the amounts of light received by at least two light-emitting and -receiving units are monitored, and it is determined whether the amount of light on the display surface 22 locally decreases. When the determination result indicates that there is such local decrease, it is determined affirmative in step S26, and the process proceeds to step S27. In contrast, when the determination result indicates that there is no such local decrease, it is determined negative in step S26, and the process proceeds to step S29.

In step S27, the coordinates of the position of input made with the non-light-emitting body on the display surface 22 are calculated. That is, the coordinates of the position at which light is blocked by the non-light-emitting body are detected. Specifically, the coordinates of the position of input made with the non-light-emitting body are calculated from a combination of angles obtained from the amounts of light received by two light-emitting and -receiving units that are adjacent along the display surface 22. When step S27 is executed, the process proceeds to step S28.

In step S28, it is determined whether light from the light-emitting parts of the individual light-emitting and -receiving units is blocked by the non-light-emitting body. Specifically, the amounts of light received by at least two light-emitting and -receiving units are monitored, and it is determined whether the amount of light on the display surface 22 locally decreases. When the determination result indicates that there is such local decrease, it is determined affirmative in step S28, and the process returns to step S27. In contrast, when the determination result indicates that there is no such local decrease, it is determined negative in step S28, and the process returns to step S22.

In step S29, it is determined whether to turn off the power of the system. Specifically, when a power off operation of the system is performed via the keyboard 30, a power off notification is sent from the controller 60 to the control unit 400. The determination here is affirmative when the control unit 400 receives a power off notification, and the flow ends. In contrast, the determination here is negative when the control unit 400 receives no power off notification, and the process returns to step S22.

In the above-described first and second examples and the first modification, whether the light-emitting pen is making input is detected, and, if such input is made, the coordinates of the position of input made with the light-emitting pen are obtained. If the light-emitting pen is making no input, whether the non-light-emitting body is making input is detected, and, if such input is made, the coordinates of the position of input made with the non-light-emitting body are obtained. That is, detection of the coordinates of the position of input made with the light-emitting pen has priority over detection of the coordinates of the position of input made with the non-light-emitting body. In FIGS. 13, 14, and 15, the order of a series of steps regarding the light-emitting pen (first detection mode) and a series of steps regarding the non-light-emitting body (second detection mode) may be changed, and detection of the coordinates of the position of input made with the non-light-emitting body may have priority over detection of the coordinates of the position of input made with the light-emitting pen.

Second Modification

Figure 16:
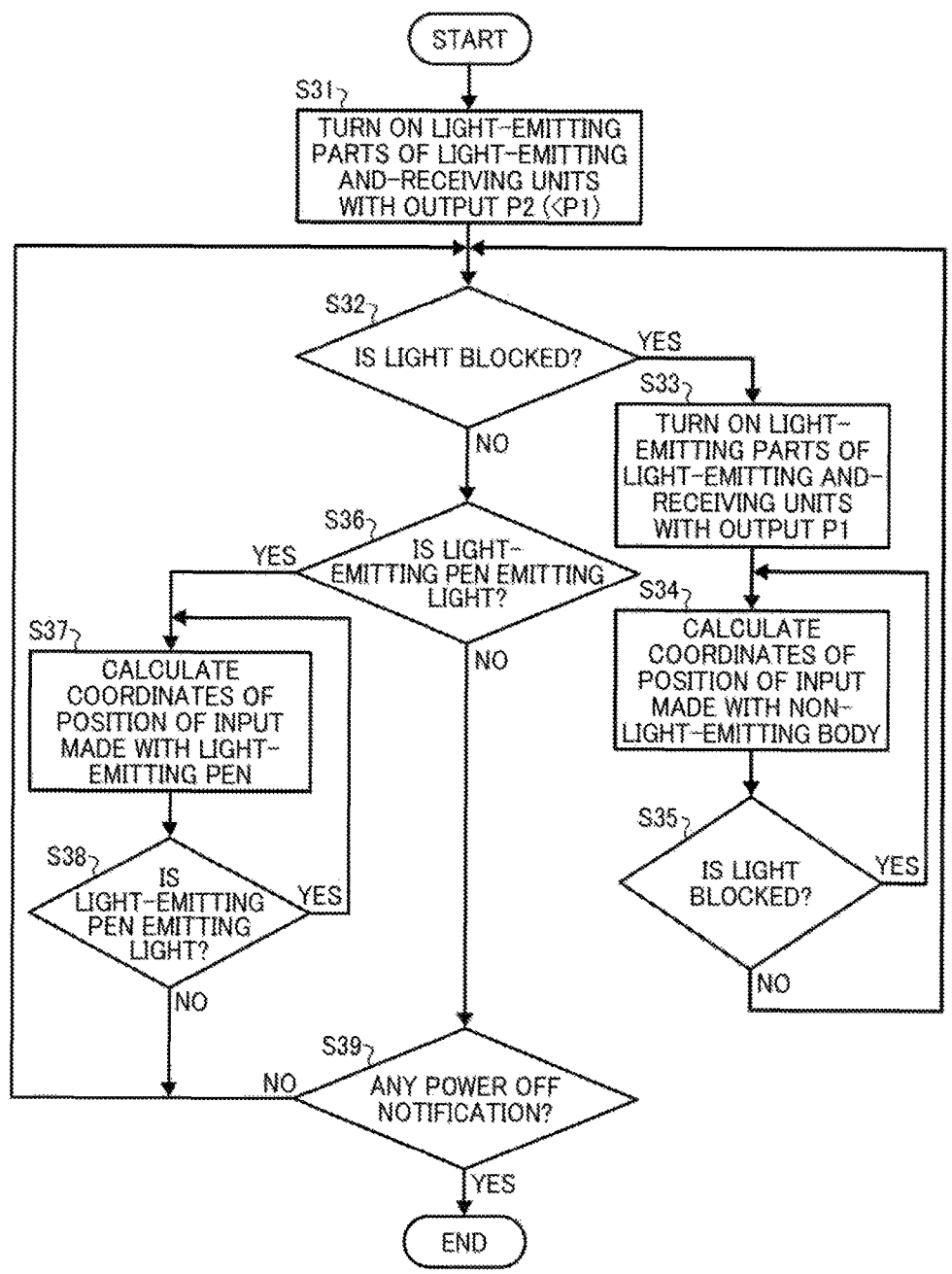
FIG. 16 is a flowchart for describing a coordinate detecting process according to a second modification.

Hereinafter, a coordinate detecting process according to a second modification using the coordinate detecting apparatus 24 according to the first embodiment will be described with reference to FIG. 16. The flowchart illustrated in FIG. 16 is based on a fourth processing algorithm executed by the control unit 400. The coordinate detecting process is started when the power of the electronic information board system 10 (hereinafter may simply be abbreviated as the "system") is turned on.

In the first step S31, the light-emitting parts of the individual light-emitting and -receiving units are turned on with the output P2 (<P1). The output P2 is set to a magnitude with which input made with both a non-light-emitting body and input made with a light-emitting pen are both detectable.

In step S32, it is determined whether light from the light-emitting parts of the individual light-emitting and -receiving units is blocked by the non-light-emitting body. Specifically, the amounts of light received by at least two light-emitting and -receiving units are monitored, and it is determined whether the amount of light on the display surface 22 locally decreases. When the determination result indicates that there is such local decrease, it is determined affirmative in step S32, and the process proceeds to step S33. In contrast, when the determination result indicates that there is no such local decrease, it is determined negative in step S32, and the process proceeds to step S36.

In step S33, the light-emitting parts of the individual light-emitting and -receiving units are turned on with P1. That is, the outputs of the light-emitting parts of the individual light-emitting and -receiving units are increased from P2 to P1. When step S33 is executed, the process proceeds to step S34.

In step S34, the coordinates of the position of input made with the non-light-emitting body on the display surface 22 are calculated. That is, the coordinates of the position at which light is blocked by the non-light-emitting body are detected. Specifically, the coordinates of the position of input made with the non-light-emitting body are calculated from a combination of angles obtained from the amounts of light received by two light-emitting and -receiving units that are adjacent along the display surface 22. When step S34 is executed, the process proceeds to step S35.

In step S35, it is determined whether light from the light-emitting parts of the individual light-emitting and -receiving units is blocked by the non-light-emitting body. Specifically, the amounts of light received by at least two light-emitting and -receiving units are monitored, and it is determined whether the amount of light on the display surface 22 locally decreases. When the determination result indicates that there is such local decrease, it is determined affirmative in step S35, and the process returns to step S34. In contrast, when the determination result indicates that there is no such local decrease, it is determined negative in step S35, and the process returns to step S32.

In step S36, it is determined whether the light-emitting pen is emitting light. That is, it is determined whether the light-emitting pen is in contact with the display surface 22. Specifically, the outputs (the amounts of received light) of light-receiving parts of at least two light-emitting and -receiving units are monitored, and it is determined whether the amount of light on the display surface 22 locally increases. When the determination result indicates that there is such local increase, it is determined affirmative in step S36, and the process proceeds to step S37. In contrast, when the determination result indicates that there is no such local increase, it is determined negative in step S36, and the process proceeds to step S39.

In step S37, the coordinates of the position of input made with the light-emitting pen on the display surface 22 are calculated. Specifically, the coordinates of the position of input made with the light-emitting pen are calculated from a combination of angles obtained from the amounts of light received by two light-emitting and -receiving units that are adjacent along the display surface 22. When step S37 is executed, the process proceeds to step S38.

In step S38, it is determined whether the light-emitting pen is emitting light. That is, it is determined whether the light-emitting pen is in contact with the display surface 22. When the determination is affirmative, the process returns to step S37; and when the determination is negative, the process returns to step S32.

In step S39, it is determined whether to turn off the power of the system. Specifically, when a power off operation of the system is performed via the keyboard 30, a power off notification is sent from the controller 60 to the control unit 400. The determination here is affirmative when the control unit 400 receives a power off notification, and the flow ends. In contrast, the determination here is negative when the control unit 400 receives no power off notification, and the process returns to step S32.

Third Modification

Figure 17:
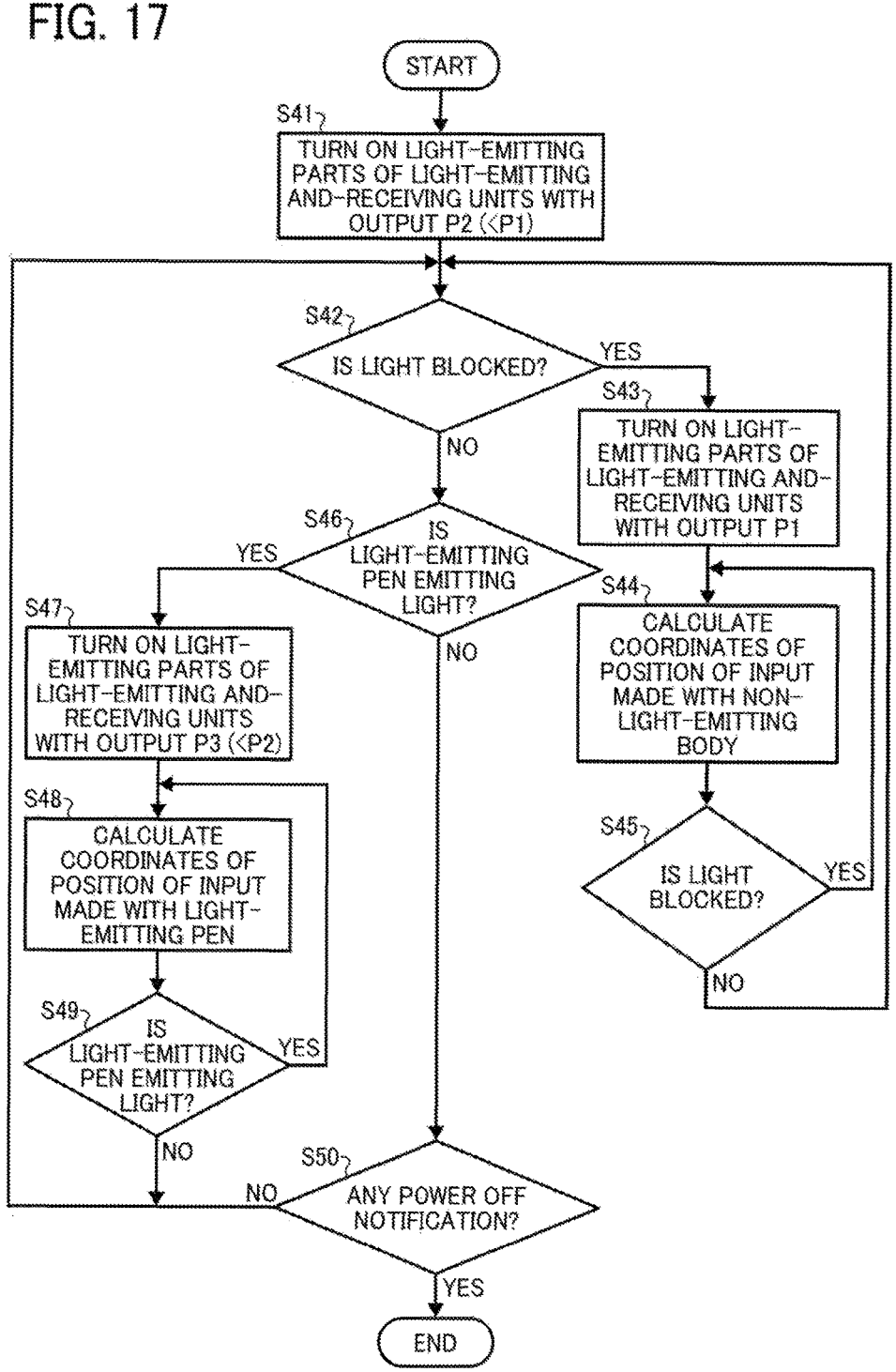
FIG. 17 is a flowchart for describing a coordinate detecting process according to a third modification.

Hereinafter, a coordinate detecting process according to a third modification using the coordinate detecting apparatus 24 according to the first embodiment will be described with reference to FIG. 17. The flowchart illustrated in FIG. 17 is based on a fifth processing algorithm executed by the control unit 400. The coordinate detecting process is started when the power of the electronic information board system 10 (hereinafter may simply be abbreviated as the "system") is turned on.

In the first step S41, the light-emitting parts of the individual light-emitting and -receiving units are turned on with the output P2 (<P1). The output P2 is set to a magnitude with which input made with both a non-light-emitting body and input made with a light-emitting pen are both detectable.

In step S42, it is determined whether light from the light-emitting parts of the individual light-emitting and -receiving units is blocked by the non-light-emitting body. Specifically, the amounts of light received by at least two light-emitting and -receiving units are monitored, and it is determined whether the amount of light on the display surface 22 locally decreases. When the determination result indicates that there is such local decrease, it is determined affirmative in step S42, and the process proceeds to step S43. In contrast, when the determination result indicates that there is no such local decrease, it is determined negative in step S42, and the process proceeds to step S46.

In step S43, the light-emitting parts of the individual light-emitting and -receiving units are turned on with P1. That is, the outputs of the light-emitting parts of the individual light-emitting and -receiving units are increased from P2 to P1. When step S43 is executed, the process proceeds to step S44.

In step S44, the coordinates of the position of input made with the non-light-emitting body on the display surface 22 are calculated. That is, the coordinates of the position at which light is blocked by the non-light-emitting body are detected. Specifically, the coordinates of the position of input made with the non-light-emitting body are calculated from a combination of angles obtained from the amounts of light received by two light-emitting and -receiving units that are adjacent along the display surface 22. When step S44 is executed, the process proceeds to step S45.

In step S45, it is determined whether light from the light-emitting parts of the individual light-emitting and -receiving units is blocked by the non-light-emitting body. Specifically, the amounts of light received by at least two light-emitting and -receiving units are monitored, and it is determined whether the amount of light on the display surface 22 locally decreases. When the determination result indicates that there is such local decrease, it is determined affirmative in step S45, and the process returns to step 344. In contrast, when the determination result indicates that there is no such local decrease, it is determined negative in step S45, and the process returns to step S42.

In step S46, it is determined whether the light-emitting pen is emitting light. That is, it is determined whether the light-emitting pen is in contact with the display surface 22. Specifically, the outputs (the amounts of received light) of light-receiving parts of at least two light-emitting and -receiving units are monitored, and it is determined whether the amount of light on the display surface 22 locally increases. When the determination result indicates that there is such local increase, it is determined affirmative in step S46, and the process proceeds to step 347. In contrast, when the determination result indicates that there is no such local increase, it is determined negative in step S46, and the process proceeds to step S50.

In step S47, the light-emitting parts of the individual light-emitting and -receiving units are turned on with an output P3 (<P2). That is, the outputs of the light-emitting parts of the individual light-emitting and -receiving units are decreased from P2 to P3. When step S47 is executed, the process proceeds to step S48. It is preferable that P3 be as small as possible.

In step S48, the coordinates of the position of input made with the light-emitting pen on the display surface 22 are calculated. Specifically, the coordinates of the position of input made with the light-emitting pen are calculated from a combination of angles obtained from the amounts of light received by two light-emitting and -receiving units that are adjacent along the display surface 22. When step S48 is executed, the process proceeds to step S49.

In step S49, it is determined whether the light-emitting pen is emitting light. That is, it is determined whether the light-emitting pen is in contact with the display surface 22. When the determination is affirmative, the process returns to step S48; and when the determination is negative, the process returns to step S42.

In step S50, it is determined whether to turn off the power of the system. Specifically, when a power off operation of the system is performed via the keyboard 30, a power off notification is sent from the controller 60 to the control unit 400. The determination here is affirmative when the control unit 400 receives a power off notification, and the flow ends. In contrast, the determination here is negative when the control unit 400 receives no power off notification, and the process returns to step S42.

Fourth Modification

Figure 18:
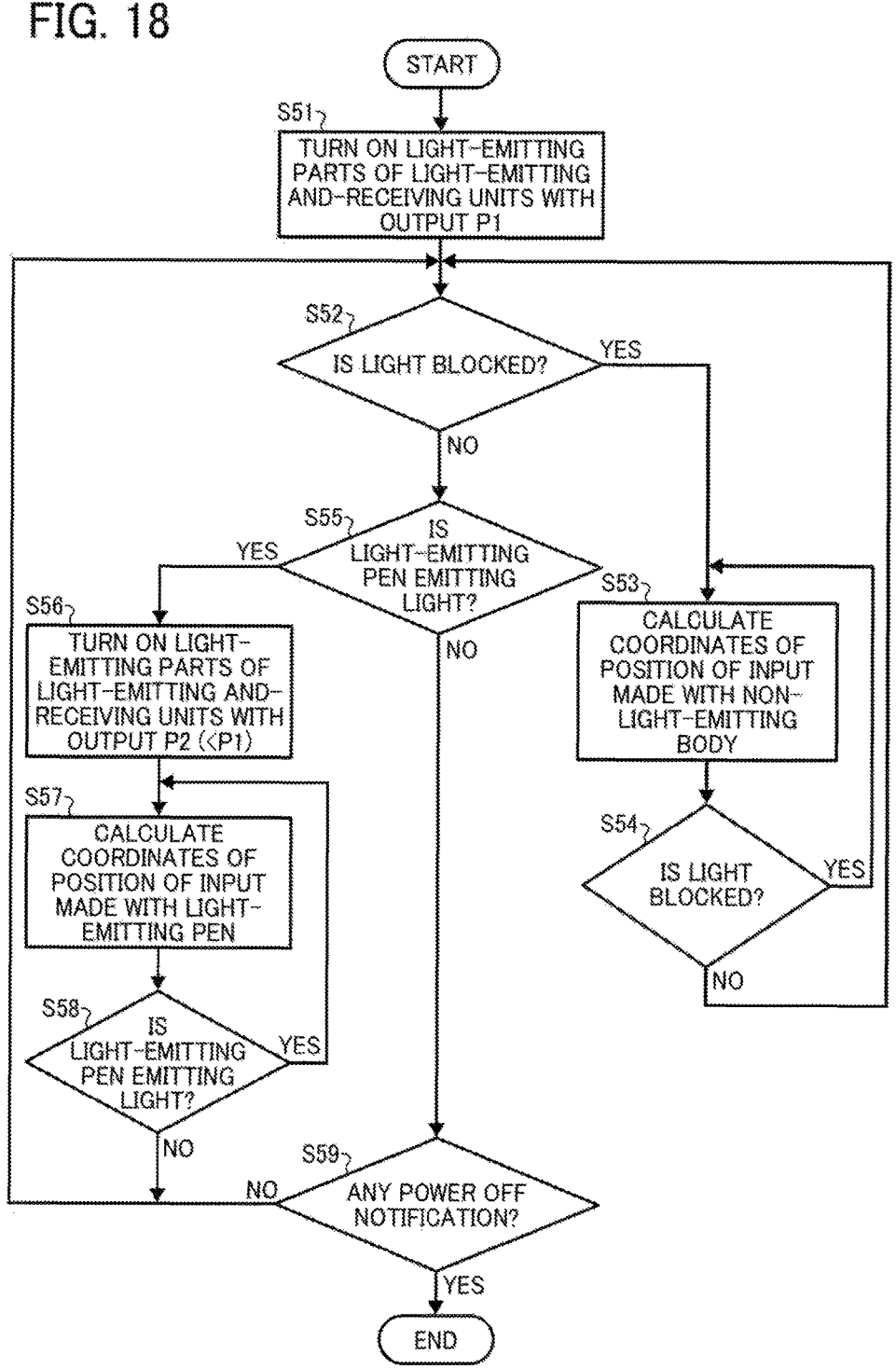
FIG. 18 is a flowchart for describing a coordinate detecting process according to a fourth modification.

Hereinafter, a coordinate detecting process according to a fourth modification using the coordinate detecting apparatus 24 according to the first embodiment will be described with reference to FIG. 18. The flowchart illustrated in FIG. 18 is based on a sixth processing algorithm executed by the control unit 400. The coordinate detecting process is started when the power of the electronic information board system 10 (hereinafter may simply be abbreviated as the "system") is turned on.

In the first step S51, the light-emitting parts of the individual light-emitting and -receiving units are turned on with the output P1. The output P1 is set to a magnitude with which input made with a non-light-emitting body and the coordinates of the input position are detectable, and also input made with a light-emitting pen is detectable.

In step S52, it is determined whether light from the light-emitting parts of the individual light-emitting and -receiving units is blocked by the non-light-emitting body. Specifically, the amounts of light received by at least two light-emitting and -receiving units are monitored, and it is determined whether the amount of light on the display surface 22 locally decreases. When the determination result indicates that there is such local decrease, it is determined affirmative in step S52, and the process proceeds to step S53. In contrast, when the determination result indicates that there is no such local decrease, it is determined negative in step S52, and the process proceeds to step S55.

In step S53, the coordinates of the position of input made with the non-light-emitting body on the display surface 22 are calculated. That is, the coordinates of the position at which light is blocked by the non-light-emitting body are detected. Specifically, the coordinates of the position of input made with the non-light-emitting body are calculated from a combination of angles obtained from the amounts of light received by two light-emitting and -receiving units that are adjacent along the display surface 22. When step S53 is executed, the process proceeds to step S54.

In step S54, it is determined whether light from the light-emitting parts of the individual light-emitting and -receiving units is blocked by the non-light-emitting body. Specifically, the amounts of light received by at least two light-emitting and -receiving units are monitored, and it is determined whether the amount of light on the display surface 22 locally decreases. When the determination result indicates that there is such local decrease, it is determined affirmative in step S54, and the process returns to step S53. In contrast, when the determination result indicates that there is no such local decrease, it is determined negative in step S54, and the process returns to step S52.

In step S55, it is determined whether the light-emitting pen is emitting light. That is, it is determined whether the light-emitting pen is in contact with the display surface 22. Specifically, the outputs (the amounts of received light) of light-receiving parts of at least two light-emitting and -receiving units are monitored, and it is determined whether the amount of light on the display surface 22 locally increases. When the determination result indicates that there is such local increase, it is determined affirmative in step S55, and the process proceeds to step S56. In contrast, when the determination result indicates that there is no such local increase, it is determined negative in step S55, and the process proceeds to step S59.

In step S56, the light-emitting parts of the individual light-emitting and -receiving units are turned on with the output P2 (<P1). That is, the outputs of the light-emitting parts of the individual light-emitting and -receiving units are decreased from P1 to P2. When step S56 is executed, the process proceeds to step S57. It is preferable that P2 be as small as possible.

In step S57, the coordinates of the position of input made with the light-emitting pen on the display surface 22 are calculated. Specifically, the coordinates of the position of input made with the light-emitting pen are calculated from a combination of angles obtained from the amounts of light received by two light-emitting and -receiving units that are adjacent along the display surface 22. When step S57 is executed, the process proceeds to step S58.

In step S58, it is determined whether the light-emitting pen is emitting light. That is, it is determined whether the light-emitting pen is in contact with the display surface 22. When the determination is affirmative, the process returns to step S57; and when the determination is negative, the process returns to step S52.

In step S59, it is determined whether to turn off the power of the system. Specifically, when a power off operation of the system is performed via the keyboard 30, a power off notification is sent from the controller 60 to the control unit 400. The determination here is affirmative when the control unit 400 receives a power off notification, and the flow ends. In contrast, the determination here is negative when the control unit 400 receives no power off notification, and the process returns to step S52.

In the above-described second to fourth modifications, detection of the coordinates of the position of input made with the non-light-emitting body has priority over detection of the coordinates of the position of input made with the light-emitting pen. In FIGS. 16, 17, and 18, the order of a series of steps regarding the light-emitting pen (first detection mode) and a series of steps regarding the non-light-emitting body (second detection mode) may be changed, and detection of the coordinates of the position of input made with the light-emitting pen may have priority over detection of the coordinates of the position of input made with the non-light-emitting body.

Although the coordinate detecting apparatus 24 according to the first embodiment has four light-emitting and -receiving unit, the number of light-emitting and -receiving units is not limited to four and is appropriately changeable, as will be described in other embodiments described later. A coordinate detecting apparatus according to each of the following embodiments has substantially the same configuration as the coordinate detecting apparatus 24 according to the first embodiment except for the point that the number of light-emitting and -receiving units is different.

Second Embodiment

Figure 19A:
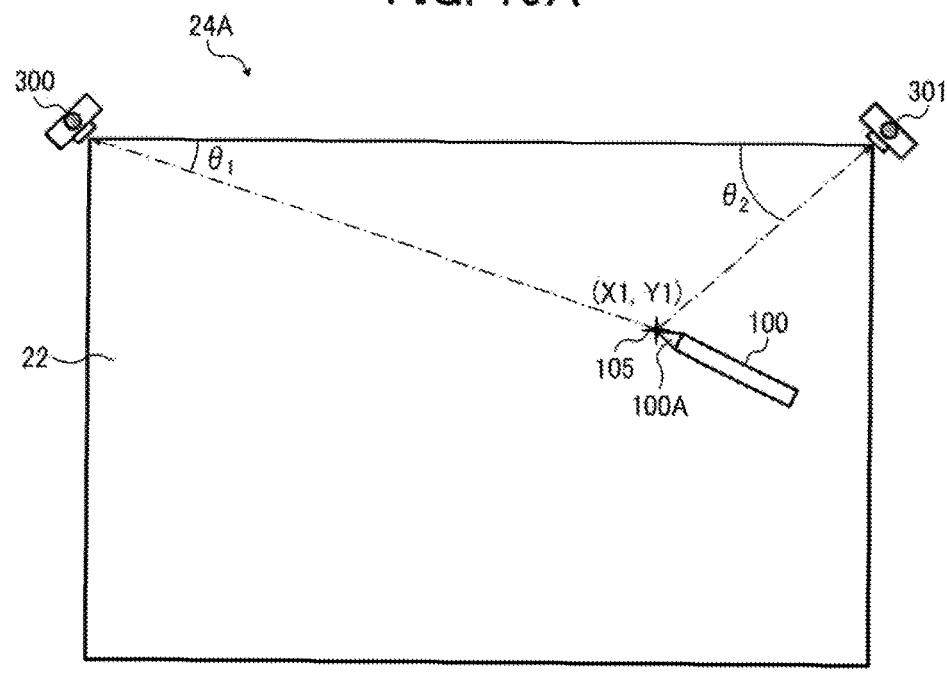
FIG. 19A is an illustration for describing a coordinate detecting apparatus according to a second embodiment.
Figure 19B:
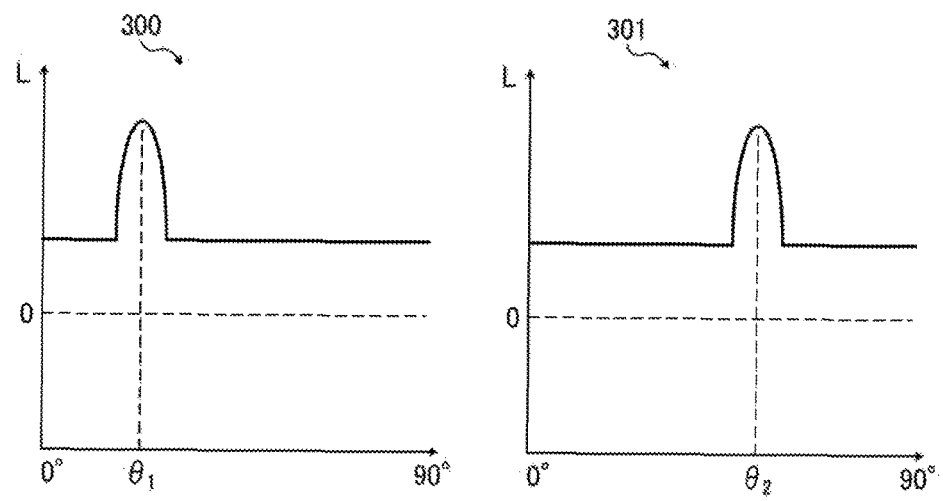
FIG. 19B includes graphs illustrating the amounts of light received by two light-emitting and -receiving units when a pen-type input device is emitting light.
Figure 20A:
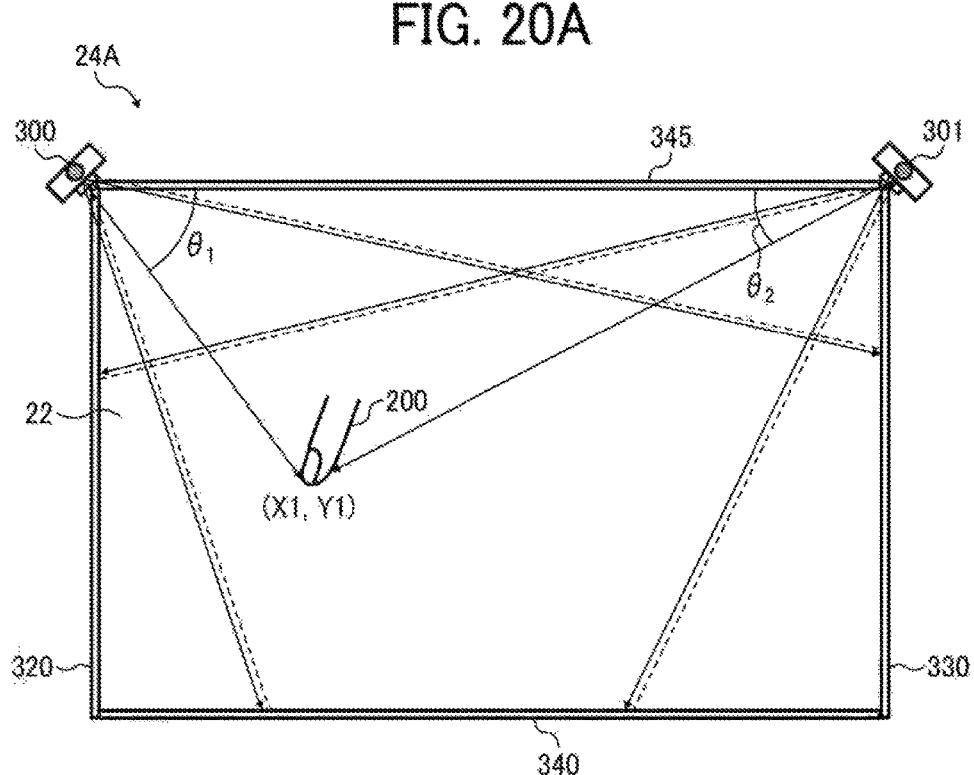
FIG. 20A is an illustration for describing the coordinate detecting apparatus according to the second embodiment.
Figure 20B:
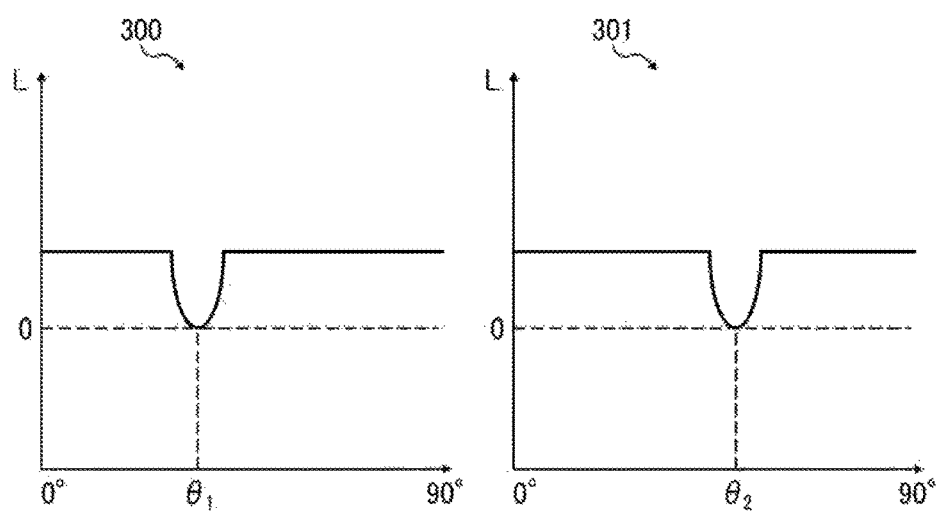
FIG. 20B includes graphs illustrating the amounts of light received by two light-emitting and -receiving units when light from the two light-emitting and -receiving units is blocked by a non-light-emitting body.

For example, like a coordinate detecting apparatus 24A according to a second embodiment illustrated in FIGS. 19A and 20A, the coordinate detecting apparatus may have only two light-emitting and -receiving units 300 and 301. In this case, at the time of detecting the coordinates of the position of input made with a light-emitting pen, the coordinates of the position of input made with the light-emitting pen may be detected from the angles $\theta_1$ and $\theta_2$ (see FIG. 19B) obtained from the amounts of light received by the two light-emitting and -receiving units 300 and 301; and, at the time of detecting the coordinates of the position of input made with a non-light-emitting body, the coordinates of the position of input made with the non-light-emitting body may be detected from the angles $\theta_1$ and $\theta_2$ (see FIG. 20B) obtained from the amounts of light received by the two light-emitting and -receiving units 300 and 301.

Third Embodiment

Figure 21A:
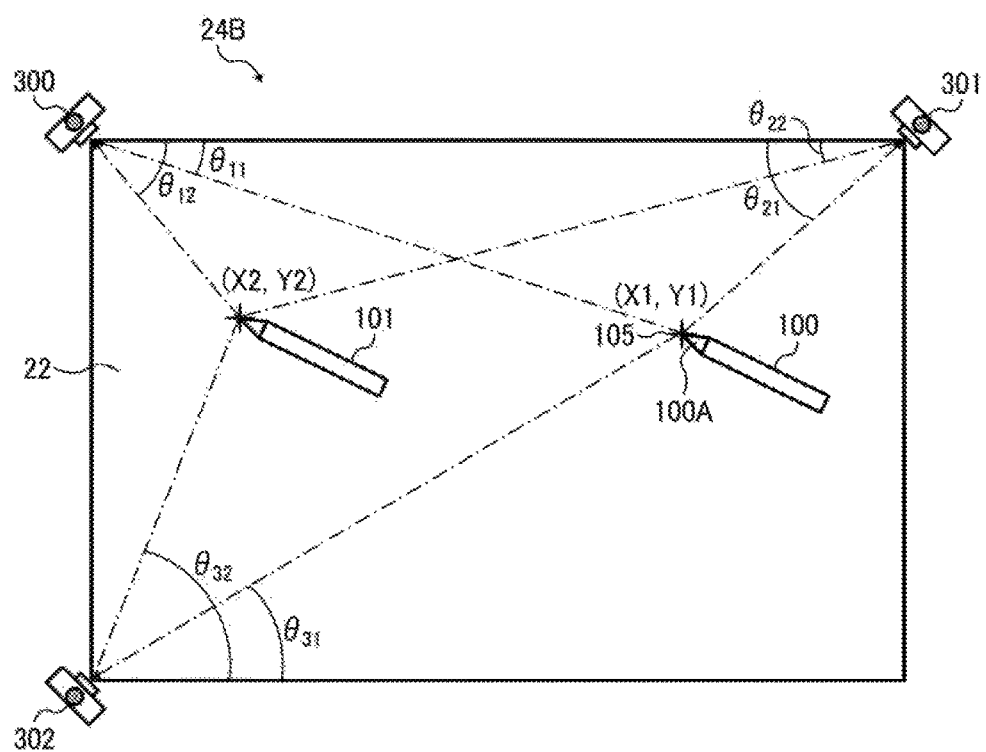
FIG. 21A is an illustration for describing a coordinate detecting apparatus according to a third embodiment.
Figure 22A:
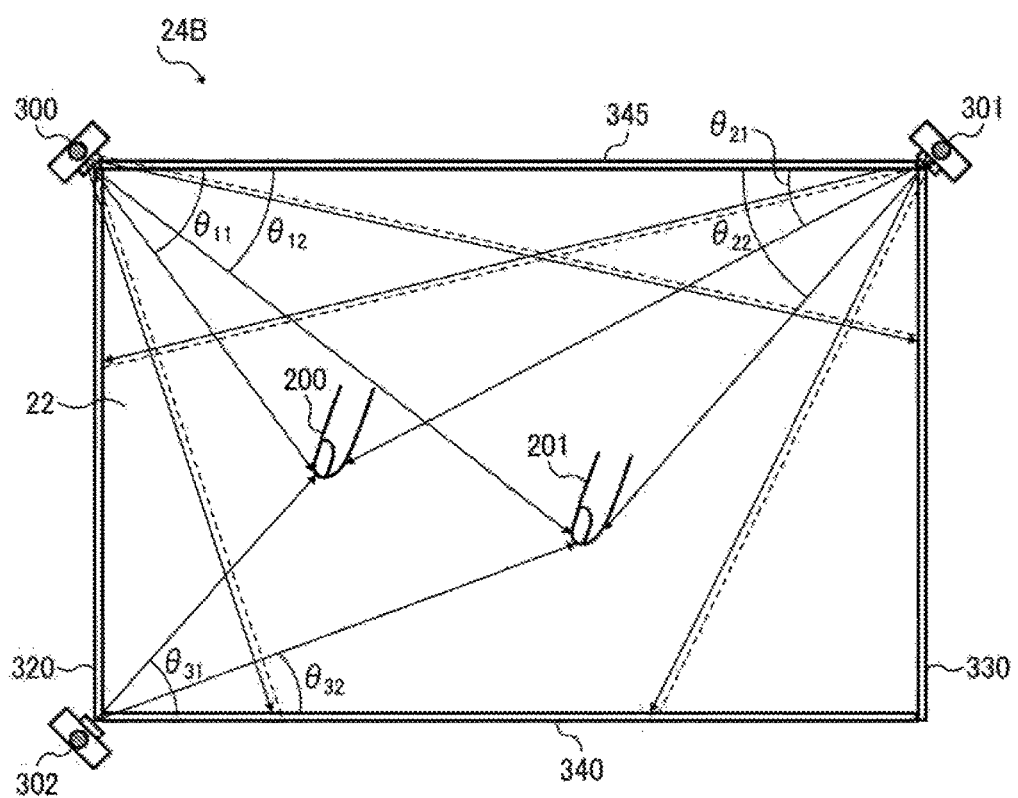
FIG. 22A is an illustration for describing the coordinate detecting apparatus according to the third embodiment.
Figure 22B:
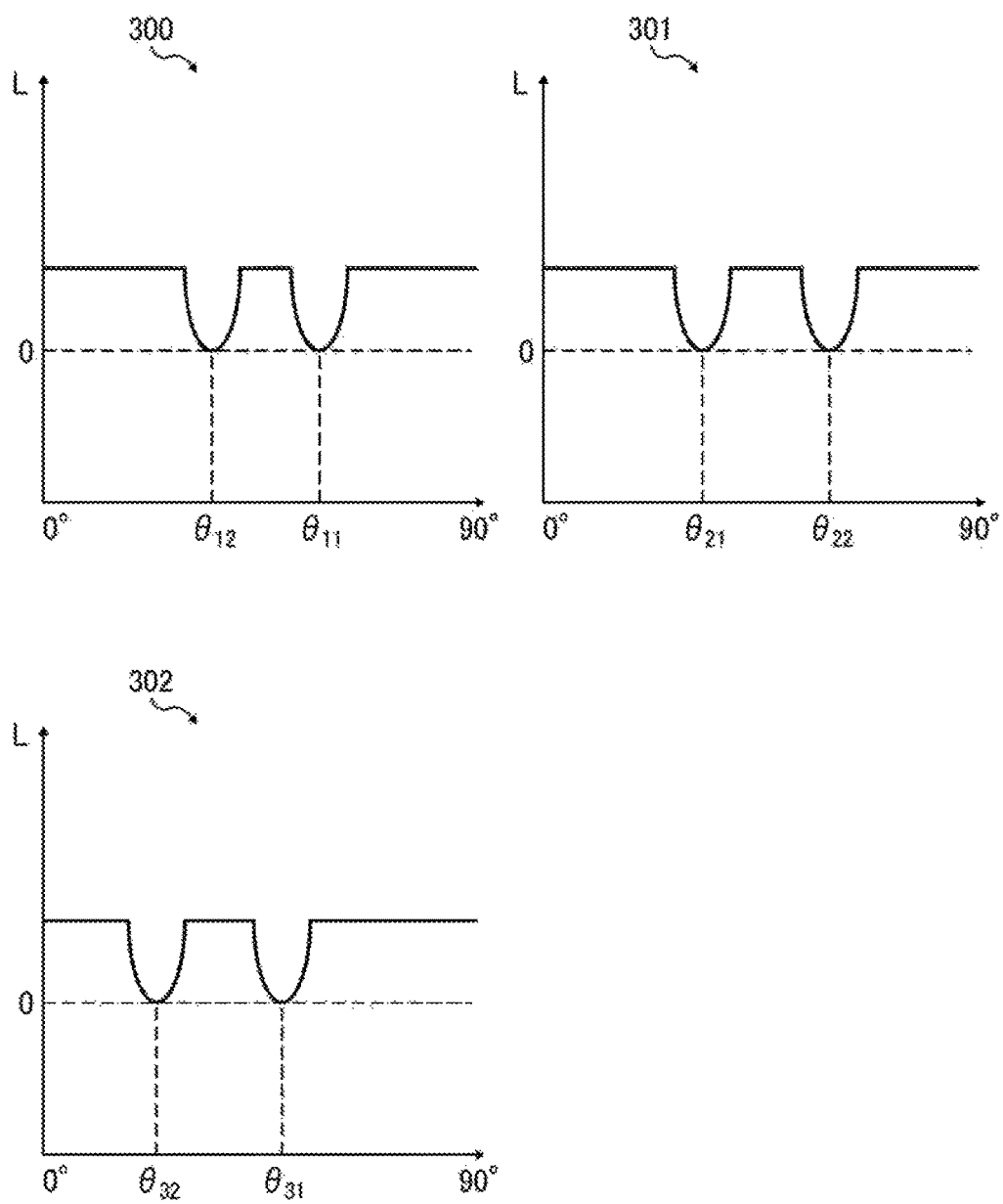
FIG. 22B includes graphs illustrating the amounts of light received by three light-emitting and -receiving units when light from the three light-emitting and -receiving units is blocked by two non-light-emitting bodies.

For example, like a coordinate detecting apparatus 248 according to a third embodiment illustrated in FIGS. 21A and 22A, the coordinate detecting apparatus may have only three light-emitting and -receiving units 300, 301, 302. In this case, at the time of detecting the coordinates of the position of input made with light-emitting pens, input made with the light-emitting pens may be detected using the angles $\theta_{11}$, $\theta_{12}$, $\theta_{21}$, $\theta_{22}$, $\theta_{31}$, and $\theta_{32}$ (see FIG. 21B) obtained from the amounts of light received by the three light-emitting and -receiving units 300, 301, and 302, and the coordinates of the position of input made with the light-emitting pens may be obtained from $(\theta_{11}, \theta_{21})$ and $(\theta_{12}, \theta_{22})$. Also, at the time of detecting the coordinates of the position of input made with non-light-emitting bodies, input made with the non-light-emitting bodies may be detected using the angles $\theta_{11}$, $\theta_{12}$, $\theta_{21}$, and $\theta_{22}$ (see FIG. 22B) obtained from the amounts of light received by the two light-emitting and -receiving units 300 and 301, and the coordinates of the position of input made with the non-light-emitting bodies may be obtained from $(\theta_{11}, \theta_{21})$ and $(\theta_{12}, \theta_{22})$.

Figure 23:
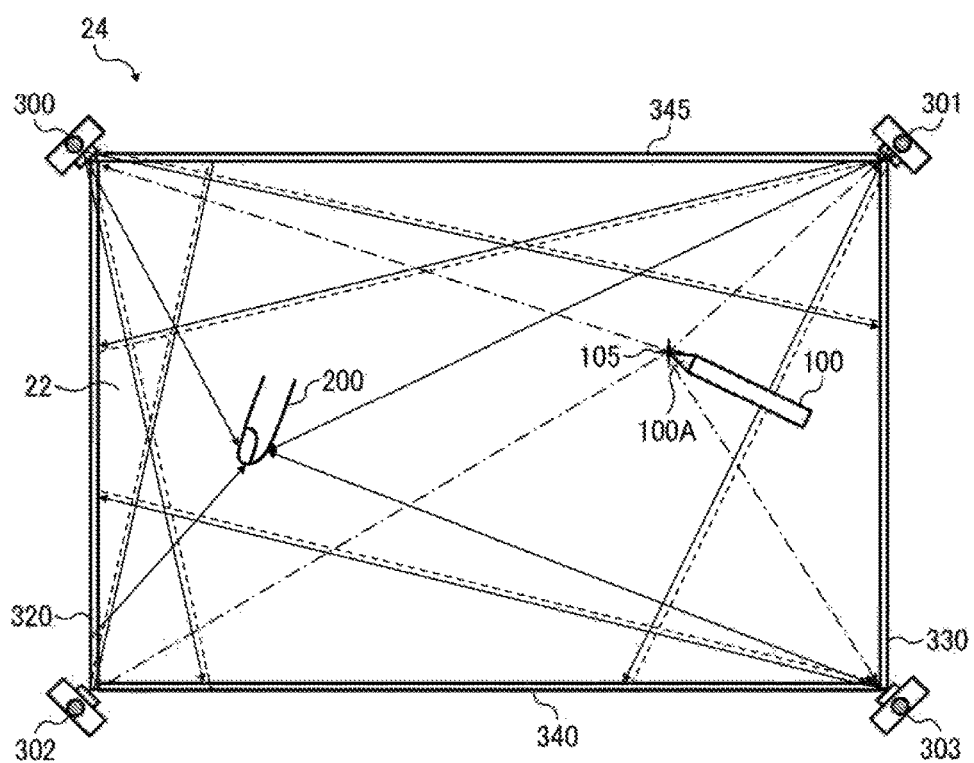
FIG. 23 is an illustration for describing a coordinate detecting method when a pen-type input device and a non-light-emitting body simultaneously make inputs.

As illustrated in FIG. 23, even when a light-emitting pen and a non-light-emitting body simultaneously make input, using the coordinate detecting apparatus 24, 24A, or 24B, after completion of detection of the coordinates of the position of input made with one of the light-emitting pen and the non-light-emitting body, the coordinates of the position of input made with the other one can be immediately detected.

A coordinate detecting apparatus according to an embodiment of the present invention detects the coordinates of a position of input made with a designation input unit on a coordinate input area set on a surface. The coordinate detecting apparatus includes the following: a plurality of light-emitting and -receiving units arranged along an outer edge of the coordinate input area, the plurality of light-emitting and -receiving units each including a light-emitting part and a light-receiving part; at least one retroreflective member arranged along the outer edge of the coordinate input area; and a control unit configured to control the plurality of light-emitting and -receiving units to detect the coordinates. The control unit detects the coordinates of the position of input made with the designation input unit in a first detection mode or a second detection mode. The first detection mode is a mode of detecting the coordinates of the position of input made with the designation input unit when lighting of the light-emitting part is in a first state, the designation input unit being configured to emit light when coming into contact with the coordinate input area. The second detection mode is a mode of detecting the coordinates of the position of input made with the designation input unit when lighting of the light-emitting part is in a second state, the designation input unit being configured to emit no light.

In one example, the first state is a state in which the light-emitting part is turned off, and the second state is a state in which the light-emitting part is turned on.

In one example, the first state is a state in which the light-emitting part is turned on with a first output (P2), and the second state is a state in which the light-emitting part is turned on with a second output (P1) higher than the first output (P2).

According to the coordinate detecting apparatus, the coordinates of a position of input made with a light-emitting pen and the coordinates of the position of input made with a non-light-emitting body can be detected under illumination suitable for the two types of detection by controlling the plurality of light-emitting and -receiving units.

As a result, the coordinates of the position of input made with the light-emitting pen and the coordinates of the position of input made with the non-light-emitting body can be detected while suppressing or reducing an increase in costs.

With a simplified configuration where the plurality of light-emitting and -receiving units is arranged along the outer edge of the display surface, the configuration can easily cope with display surfaces of various sizes.

It is preferable that a value obtained by dividing the first output by the second output be less than or equal to 1/N (N≥2).

In this case, the first output (P2) can be set to a relatively small value suitable for detection of the coordinates of the position of input made with the light-emitting pen, and the second output (P1) can be set to a relatively large value suitable for detection of the coordinates of the position of input made with the non-light-emitting body. It is preferable that the first output be as small as possible.

It is also preferable that the first output (P2) be less than a light output of the light-emitting pen. In this case, reduction in the accuracy of detection of input made with the light-emitting pen can be suppressed or reduced.

It is also preferable that the control unit 400 determine whether the light-emitting pen is making input, based on outputs of the light-receiving parts, and determine whether to execute the first detection mode in accordance with the determination result.

It is also preferable that the control unit 400 determine whether the non-light-emitting body is making input, based on outputs of the light-receiving parts, and determine whether to execute the second detection mode in accordance with the determination result.

By having an identical wavelength for light beams from the light-emitting parts of the plurality of light-emitting and -receiving units, the specifications of the light-emitting parts and the light-receiving parts can be made common among the light-emitting and -receiving units.

By having an identical wavelength for light beams from the light-emitting parts of the plurality of light-emitting and -receiving units (the former case) and for a light beam from the light-emitting pen (the latter case), the coordinates of the position of input made with the light-emitting pen can be detected by detecting a local illumination change. Thus, a wavelength selecting filter or the like, which is necessary for having different wavelengths for the former case and the latter case, is unnecessary.

Since light beams from the light-emitting parts of the plurality of light-emitting and -receiving units and a light beam from the light-emitting pen are all infrared rays, stable detection can be performed by the light-receiving parts using invisible light.

When the plurality of light-emitting and -receiving units are at least three light-emitting and -receiving units, the position of input made with the designation input unit can be more accurately estimated, compared with the case of having only two light-emitting and -receiving units.

The coordinate input area has a polygonal shape (rectangular) with four vertices, and four light-emitting and -receiving units are arranged near the four vertices, respectively. In this case, size-reduction of the casing 20a of the display 20 and size-increase of the coordinate input area (display surface 22) can be simultaneously achieved.

In short, it is preferable that the coordinate input area be a polygonal shape with at least three vertices, and it is also preferable that at least three light-emitting and -receiving units be arranged near the at least three vertices, respectively.

It is preferable that the light-emitting pen include the light-emitting element 105, the detector (writing unit 100A and erasing unit 100B) to detect contact with and separation from the coordinate input area, and the transmission circuit unit 180 (control unit) to control the light-emitting element on the basis of the detection result obtained by the detector.

When a bezel covering the at least one retroreflective member is further provided, the retroreflective surface of the at least one retroreflective member can be protected from a foreign matter such as dust, and accordingly reduction in the accuracy of detecting the coordinates can be suppressed or reduced.

The electronic information board system 10 includes the display 20, which has the display surface 22 where the coordinate input area is set, and the coordinate detecting apparatus to detect the coordinates of the position of input made with the designation input unit on the coordinate input area.

In this case, a display system capable of realizing the process of displaying in accordance with input made with the light-emitting pen and the non-light-emitting body at low cost can be provided.

The coordinate detecting apparatus is not limited to a display system, and the coordinate detecting apparatus is applicable to a projection system including an image projecting apparatus (such as a projector) that projects an image onto a projection surface (such as a screen surface) where a coordinate input area is set. Specifically, the same advantages and effects as those achieved in the case of a display system can be achieved by arranging a plurality of light-emitting and -receiving units along the outer edge of the projection surface and arranging at least one retroreflective member along the outer edge of the projection surface.

As a result, the coordinates of the position of input made with the light-emitting pen and the coordinates of the position of input made with the non-light-emitting body can be detected while suppressing or reducing an increase in costs.

Although infrared rays are used as light beams (wireless signals) emitted from the light-emitting parts of the light-emitting and -receiving units and from the light-emitting element of the light-emitting pen in the above-described embodiments, the light beams are not limited to infrared rays, and light beams in other wavelength ranges (preferably invisible light) may be used. Also in this case, it is preferable to have an identical wavelength for light beams emitted from the light-emitting pans or for light beams emitted from the light-emitting parts and the light-emitting element.

Although the electronic information board system 10 is adopted as a display system in the above-described embodiments, alternatively a system including, for example, a PCs display, an electronic blackboard, or an electronic whiteboard whose display surface can be provided with a touch-screen function may be adopted as a display system.

Although the control unit 400 is provided separately from the controller 60 in the above-described embodiments, the control unit 400 may be part of the controller 60. Alternatively, instead of providing the control unit 400, part of the controller 60 (such as the controller operating system unit 220) may function as the control unit 400.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:
1. A coordinate detecting apparatus, comprising:
a plurality of light-emitting and light-receiving units arranged along an outer edge of a coordinate input area on a display surface, the plurality of light-emitting and light-receiving units each including a light-emitting part to emit illumination light and a light-receiving part;
at least one retroreflective member arranged along the outer edge of the coordinate input area; and
processing circuitry configured to control the plurality of light-emitting and light-receiving units to detect coordinates of a position of an input made with a designation input unit in both a first detection mode and in a second detection mode, the first detection mode being a mode of detecting the coordinates of the position of the input made with the designation input unit based on input light emitted from the designation input unit, while each of the light-emitting parts is turned off; and the second detection mode being a mode of detecting the coordinates of the position of the input made with the designation input unit based on the illumination light being blocked by the designation input unit, while each of the light-emitting parts is turned on with a non-zero output,
wherein the processing circuitry is further configured to determine whether the designation input is emitting the input light or not when the designation input unit contacts the coordinate input area while each of the light emitting parts is turned on and emitting the illumination light;
when determining that the designation input unit is emitting the input light, the processing circuitry controls the light-emitting and light receiving units to detect the coordinates of the position of the input in the first detection mode, while each of the light-emitting parts is turned off; and
when determining that the designation input unit is not emitting the input light, the processing circuitry controls the light-emitting and light-receiving units to detect the coordinates of the position of the input in the second detection mode, while each of the light-emitting parts is turned on with the non-zero output.
2. The coordinate detecting apparatus according to claim 1, wherein a value obtained by dividing the first output by the second output is less than or equal to 1/N (N≥2).
3. The coordinate detecting apparatus according to claim 1, wherein the processing circuitry is further configured to determine whether the designation input unit provides the input onto the coordinate input area, based on an output of a light-receiving part of at least one of the light-emitting and light-receiving units that receives the input light from the designation input unit, and determine whether to execute the first detection mode in accordance with a result of the determination.
4. The coordinate detecting apparatus according to claim 1, wherein the processing circuitry is further configured to determine, prior to detecting the coordinates of the position of the input, whether the designation input unit provides the input onto the coordinate input area, based on an output of one of the light-receiving parts that detects blocking of the illumination light by the designation input unit, and determine whether to execute the second detection mode in accordance with a result of the determination.
5. The coordinate detecting apparatus according to claim 1, wherein the light-emitting parts of the plurality of light-emitting and light-receiving units emit illumination light beams having wavelengths that are identical with each other.
6. The coordinate detecting apparatus according to claim 5, wherein the wavelengths of the illumination light beams emitted from each of the light emitting parts of the plurality of light-emitting and light-receiving units and a wavelength of the input light received from the designation input unit that emits the input light are identical.
7. The coordinate detecting apparatus according to claim 5, wherein the illumination light beams are infrared rays.
8. The coordinate detecting apparatus according to claim 1, wherein the plurality of light-emitting and light-receiving units are at least three light-emitting and light-receiving units.
9. The coordinate detecting apparatus according to claim 8, wherein:
the coordinate input area has a polygonal shape having at least three vertices, and
the at least three light-emitting and light-receiving units are arranged near the at least three vertices, respectively.
10. The coordinate detecting apparatus according to claim 1, further comprising:
a bezel covering the at least one retroreflective member.
11. A system, comprising:
the coordinate detecting apparatus according to claim 1; and
the designation input unit configured to emit the illumination light,
wherein the designation input unit, which is configured to emit the illumination light, includes
a light-emitting element;
a detector to detect contact with and separation from the coordinate input area; and
a control circuit configured to control the light-emitting element based on a result of the detection.
12. A display system, comprising:
a display apparatus including a display surface on which the coordinate input area is set; and
the coordinate detecting apparatus according to claim 1, the coordinate detecting apparatus being configured to detect coordinates of the position of the input made with the designation input unit on the coordinate input area.
13. A projection system, comprising:
an image projecting apparatus configured to project an image onto a projection surface on which the coordinate input area is set; and
the coordinate detecting apparatus according to claim 1, the coordinate detecting apparatus being configured to detect coordinates of the position of the input made with the designation input unit on the coordinate input area.
14. A coordinate detecting method for calculating coordinates of a position of an input made with a designation input unit on a coordinate input area set on a surface, a plurality of light-emitting and light-receiving units and at least one retroreflective member being arranged along an outer edge of the coordinate input area, the plurality of light-emitting and light-receiving units each including a light-emitting part to emit illumination light and a light-receiving part, the method comprising:

turning on each of the light-emitting parts with a second output level;

receiving the illumination light by the light-receiving part of at least one of the plurality of light-emitting and light-receiving units;

first determining whether the designation input unit is emitting input light or not, based on a result of the receiving step, when the designation input unit contacts the coordinate input area while each of the light-emitting parts is turned on and emitting the illumination light;

when a result of the first determining step is affirmative, turning on each of the light-emitting parts with a first output level lower than the second output level, and controlling the light-emitting and light receiving units to detect the coordinates of the position of the input in a first detection mode, while each of the light-emitting parts is turned on with the first output level, based on outputs of the light-receiving parts, and, when the result of the first determining step is negative, second determining whether the illumination light is blocked by the designation input unit, based on the outputs of the light-receiving parts; and when a result of the second determining step is affirmative, controlling the light-emitting and light-receiving units to detect the coordinates of the position of the input in a second detection mode, while each of the light-emitting parts is turned on with the second output level, based on the outputs of the light-receiving parts.

15. A coordinate detecting method for calculating coordinates of a position of an input made with a designation input unit on a coordinate input area set on a surface, a plurality of light-emitting and light-receiving units and at least one retroreflective member being arranged along an outer edge of the coordinate input area, the plurality of light-emitting and light-receiving units each including a light-emitting part to emit illumination light and a light-receiving part, the method comprising:

turning on each of the light-emitting parts with a second output level;

receiving light by the light-receiving parts;

first determining whether the illumination light is blocked by the designation input unit, based on a result of the receiving step;

when a result of the first determining step is affirmative, calculating the coordinates based on outputs of the light-receiving parts, and, when the result of the first determining step is negative, second determining whether the designation input unit is emitting input light or not, based on the outputs of the light-receiving parts, when the designation input unit contacts the coordinate input area while each of the light-emitting parts is turned on and emitting the illumination light; and when a result of the second determining step is affirmative, turning on the light-emitting parts with a first output level lower than the second output level and controlling the light-emitting and light receiving units to detect the coordinates of the position of the input, while each of the light-emitting parts is turned on with the first output level, based on the outputs of the light-receiving parts.

* * * * *